(12) United States Patent
Mineno

(10) Patent No.: US 9,721,213 B2
(45) Date of Patent: Aug. 1, 2017

(54) INFORMATION MATCHING APPARATUS, METHOD OF MATCHING INFORMATION, AND COMPUTER READABLE STORAGE MEDIUM HAVING STORED INFORMATION MATCHING PROGRAM

(71) Applicant: FUJITSU LIMITED, Kawasaki-shi, Kanagawa (JP)

(72) Inventor: Kazuo Mineno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/056,080

(22) Filed: Feb. 29, 2016

(65) Prior Publication Data
US 2016/0180254 A1  Jun. 23, 2016

Related U.S. Application Data

(63) Continuation of application No. 13/307,415, filed on Nov. 30, 2011, now abandoned.

(30) Foreign Application Priority Data

Jan. 28, 2011 (JP) .................................. 2011-017222

(51) Int. Cl.
G06N 99/00 (2010.01)
G06K 9/00 (2006.01)

(52) U.S. Cl.
CPC ................... *G06N 99/005* (2013.01)

(58) Field of Classification Search
None
See application file for complete search history.

(56) References Cited

U.S. PATENT DOCUMENTS 6,119,112 A   9/2000   Bush
6,898,469 B2  5/2005   Bickford
(Continued)

FOREIGN PATENT DOCUMENTS

JP        5-282269 A    10/1993
JP      2004-253011 A    9/2004
(Continued)

OTHER PUBLICATIONS

Foody, G.M. et al. (2004). "Toward intelligent training of supervised image classifications: directing training data acquisition for SVM classification." Remote Sensing of Environment 93.1: 107-117. DOI:10.1016/j.rse.2004.06.017.*

(Continued)

*Primary Examiner* — Paulinho E Smith
*Assistant Examiner* — Benjamin Buss
(74) *Attorney, Agent, or Firm* — Fujitsu Patent Center

(57) ABSTRACT

The information matching apparatus includes: a training data setting unit that sets supervised data in a machine learning device of supervised learning that learns judgment criteria used for a judgment of identicalness, similarity, and relevance between a plurality of records by matching the records configured by sets of values corresponding to items; a check point setting unit that sets a check point configured by one set of two records used for evaluating the set supervised data; and a learning result evaluation unit, for the set check point, acquires a change between a judgment result using judgment criteria derived as a result of learning based on set first supervised data and a judgment result using judgment criteria derived as a result of learning based on set second supervised data set and evaluates the supervised data based on the acquired change.

11 Claims, 20 Drawing Sheets

(56) References Cited

U.S. PATENT DOCUMENTS

| | | | |
|---|---|---|---|
| 7,565,370 | B2 | 7/2009 | Milenova et al. |
| 2002/0174078 | A1 | 11/2002 | Mitsutani |
| 2003/0083859 | A1 | 5/2003 | Murata |
| 2003/0110038 | A1 | 6/2003 | Sharma et al. |
| 2003/0225526 | A1 | 12/2003 | Golub et al. |
| 2004/0181526 | A1* | 9/2004 | Burdick ............ G06F 17/30598 707/999.003 |
| 2005/0089878 | A1 | 4/2005 | Debe et al. |
| 2005/0169517 | A1 | 8/2005 | Kasai |
| 2006/0039593 | A1 | 2/2006 | Sammak et al. |
| 2006/0064415 | A1 | 3/2006 | Guyon et al. |
| 2006/0074823 | A1 | 4/2006 | Heumann et al. |
| 2006/0074908 | A1 | 4/2006 | Selvaraj et al. |
| 2007/0105105 | A1 | 5/2007 | Clelland et al. |
| 2008/0022844 | A1 | 1/2008 | Poliner et al. |
| 2008/0133434 | A1 | 6/2008 | Asar et al. |
| 2008/0175429 | A1 | 7/2008 | Shi et al. |
| 2008/0201281 | A1 | 8/2008 | Graf et al. |
| 2008/0232696 | A1 | 9/2008 | Kasahara et al. |
| 2008/0233576 | A1 | 9/2008 | Weston et al. |
| 2008/0243728 | A1 | 10/2008 | Li et al. |
| 2008/0270338 | A1* | 10/2008 | Adams ............... G06K 9/00986 706/48 |
| 2009/0204557 | A1 | 8/2009 | Zhang |
| 2009/0228412 | A1 | 9/2009 | Matsumoto et al. |
| 2009/0233576 | A1 | 9/2009 | Fieldhouse et al. |
| 2009/0306950 | A1 | 12/2009 | De Winter et al. |
| 2010/0002929 | A1 | 1/2010 | Sammak et al. |
| 2010/0014762 | A1 | 1/2010 | Renders et al. |
| 2010/0057419 | A1 | 3/2010 | Nagarajaram et al. |
| 2010/0088307 | A1 | 4/2010 | Watanabe |
| 2010/0255486 | A1* | 10/2010 | Showe ................. C12Q 1/6886 435/6.1 |
| 2010/0299379 | A1 | 11/2010 | Das Gupta et al. |
| 2011/0082824 | A1 | 4/2011 | Allison et al. |
| 2011/0097743 | A1 | 4/2011 | Bihain et al. |
| 2011/0142335 | A1 | 6/2011 | Ghanem et al. |
| 2011/0170781 | A1 | 7/2011 | Bronstein et al. |
| 2011/0255486 | A1 | 10/2011 | Luo et al. |
| 2012/0106847 | A1 | 5/2012 | Qi |
| 2012/0197826 | A1 | 8/2012 | Mineno |
| 2012/0219191 | A1 | 8/2012 | Benzarti et al. |

FOREIGN PATENT DOCUMENTS

| | | | |
|---|---|---|---|
| JP | 2005-198970 | A | 7/2005 |
| JP | 2006-221478 | A | 8/2006 |
| JP | 2009-265905 | A | 11/2009 |
| JP | 2010-86455 | A | 4/2010 |

OTHER PUBLICATIONS

Wang, J. et al. "Training data selection for support vector machines." Advances in natural computation. Springer Verlin Heidelberg, 2005. 554-564. 001: 10.1007/11539087_71.

Yu, H, et al. "Classifying large data sets using SVMs with hierarchical clusters." Proceedings of the ninth ACM SIGKDD international conference on Knowledge discovery and data mining. ACM, 2003. 001: 10.1145/956750.956786.

Foody, G.M. et al. "Toward intelligent training of supervised image classifications: directing training data acquisition for SVM classification." Remote Sensing of Environmment 93.1 (2004): pp. 107-117. 001: 10.1 016/j.rse.2004.06.017.

Liang, X. "An effective method of pruning support vector machine classifiers." IEEE Transactions on Neural Networks, vol. 21, No. 1, Jan. 2010. pp. 26-38. 001: 10.11 09/TNN.2009.2033677.

Saurez, A. et al. "High Precision Word Sense Disambiguation Based on Maximum Entropy Probability Models." 2001. pp. 1-24.

Japanese Office Action issued Apr. 6, 2014 for corresponding Japanese Patent Application 2011-017222, with English Translation, 6 pages.

Akiko Aizawa et al., "Techniques and Research Trends in Record Linkage Studies," The Transactions of The Institute of Electronics, Information and Communication Engineers, D-1, vol. J88-D-1, No. 3, pp. 576-589, The Institute of Electronics, Information and Communication Engineers, with English Translation, 2005.

Japanese Office Action mailed Apr. 8, 2014 for corresponding Japanese Application No. 2011-017221, with English Translation, 7 pages.

U.S. Office Action mailed Jan. 8, 2015 for related U.S. Appl. No. 13/307,415.

U.S. Office Action mailed Feb. 24, 2014 for related U.S. Appl. No. 13/307,415.

U.S. Office Action mailed Aug. 31, 2015 for related U.S. Appl. No. 13/307,415.

U.S. Office Action mailed Sep. 3, 2014 for related U.S. Appl. No. 13/307,415.

Tong, S. et al. "Support Vector Machine Active Learning with Applications to Text Classification." The Journal of Machine Learning Research 2 (2001); 45-66.

* cited by examiner

FIG.3

| NO. | EVALUATION INDEX NAME | TARGET VALUE | OBJECT VALUE | DERIVATION SEQUENCE |
|---|---|---|---|---|
| 1 | ACCURACY RATE OF JUDGMENT RESULT | JUDGMENT RESULT | ACCURACY RATE OF JUDGMENT RESULT | DETECT DIFFERENCE BETWEEN JUDGMENT RESULT AND NAME IDENTIFICATION RESULT SET IN ADVANCE FOR EACH CHECK POINT AT TIME OF SETTING CHECK POINTS AND CALCULATE RATIO OF CORRECT JUDGMENT |
| 2 | CHANGE IN CLASSIFICATION HYPERPLANE | JUDGMENT RESULT | CHANGE IN JUDGMENT RESULT | STATISTICALLY CALCULATE CHANGE AMOUNT IN JUDGMENT RESULTS (White/Gray/Black) BASED ON OLD AND NEW TRAINING DATA |
| 3 | JUDGMENT OF SIGNIFICANT POINT | JUDGMENT RESULT OF SPECIFIC POINT | JUDGMENT RESULT | JUDGE THAT JUDGMENT RESULT (White/Gray/Black) IS NAME IDENTIFICATION RESULT SET IN ADVANCE, AND THERE IS NO CHANGE BASED ON NEW AND OLD TRAINING DATA |
| 4 | TREND IN INDIVIDUAL CHANGE IN JUDGMENT RESULT | JUDGMENT RESULT | TREND IN INDIVIDUAL CHANGE IN JUDGMENT RESULT | ACQUIRE CHANGE FROM OLD JUDGMENT TO NEW JUDGMENT BY CHECKING DIFFERENCE IN JUDGMENT RESULTS BASED ON OLD AND NEW TRAINING DATA FOR EACH CHECK POINT |
| 5 | TREND IN TOTAL EVALUATION VALUE | TOTAL EVALUATION VALUE | DIFFERENCE IN TOTAL EVALUATION VALUE | CALCULATE DIFFERENCE IN TOTAL EVALUATION VALUES BASED ON NEW AND OLD TRAINING DATA FOR EACH CHECK POINT |
| 6 | HIGHEST VALUE OF TOTAL EVALUATION VALUE | TOTAL EVALUATION VALUE | CHANGE IN HIGHEST VALUE OF TOTAL EVALUATION VALUE | DETECT HIGHEST VALUE OF TOTAL EVALUATION VALUE AND CALCULATE AMOUNT OF CHANGE BASED ON NEW AND OLD TRAINING DATA |
| 7 | TREND IN WEIGHTING FACTOR | LEARNING RESULT (WEIGHTING FACTOR) | DIFFERENCE IN WEIGHTING FACTOR | DETECT WEIGHING FACTOR HAVING LARGE DIFFERENCE (CHANGE IN RATIO TO OTHER WEIGHTING FACTOR) |

FIG.4

| NO. | EVALUATION INDEX NAME | DETERMINATION GUIDE | REFLECTION GUIDE AFTER DETERMINATION |
|---|---|---|---|
| 1 | ACCURACY RATE OF JUDGMENT RESULT | DETERMINE "○" FOR CASE WHERE ACCURACY RATE INCREASES AND "×" FOR CASE WHERE ACCURACY RATE DECREASES | DIFFERENCE (DIFFERENCE FROM OLD TRAINING DATA) OF NEW TRAINING DATA THAT IS CLOSE TO INCORRECT CHECKPOINT, AND SEARCH FOR TRAINING DATA THAT DOES NOT HAVE REVERSE SETTING (TRAINING DATA OF NEGATIVE EXAMPLE IF CHECK POINT IS White) AND REMOVE TRAINING DATA |
| 2 | CHANGE IN CLASSIFICATION HYPERPLANE | DETERMINE PATTERN OF JUDGMENT RESULT OF WHICH CHANGE IS LARGE BY REFERRING TO CHECK POINT THAT RESULTS IN JUDGMENT RESULT AS GOOD CHANGE (○) OR BAD CHANGE (×) | WHEN THERE IS BAD TREND OF CHANGE, SEARCH FOR TRAINING DATA THAT DOES NOT HAVE REVERSE SETTING FOR DIFFERENCE OF NEW TRAINING DATA THAT IS CLOSE TO CHECK POINT OF PATTERN AND REMOVE TRAINING DATA |
| 3 | JUDGMENT OF SIGNIFICANT POINT | FOR EACH CHECK POINT FOR WHICH JUDGMENT IS CHANGED, IT IS DETERMINED WHETHER GOOD CHANGE OCCURS (○) OR BAD CHANGE OCCURS (×) | WHEN THERE IS BAD TREND OF CHANGE, SEARCH FOR TRAINING DATA THAT DOES NOT HAVE REVERSE SETTING FOR DIFFERENCE OF NEW TRAINING DATA THAT IS CLOSE TO CORRESPONDING CHECK POINT AND REMOVE TRAINING DATA |
| 4 | INDIVIDUAL CHANGE TREND IN JUDGMENT RESULT | | |
| 5 | TREND IN TOTAL EVALUATION VALUE | DETERMINE GOOD CHANGE (○) OR BAD CHANGE (×) FOR EACH CHECK POINT OF WHICH CHANGE AMOUNT IS LARGE | |
| 6 | HIGHEST VALUE OF TOTAL EVALUATION VALUE | WHEN HIGHEST TOTAL EVALUATION VALUE INCREASES, CONTRADICTION OF NEW TRAINING DATA IS DETERMINED TO BE RESOLVED (○), AND WHEN HIGHEST TOTAL EVALUATION VALUE DECREASES, CONTRADICTION OF NEW TRAINING DATA IS DETERMINED TO INCREASE (×) | FOR RECORD PAIR OF DIFFERENCE OF NEW TRAINING DATA FROM OLD TRAINING DATA, CORRECTION IS MADE BY JUDGMENT WHETHER THERE IS CONTRADICTION WITH OTHER TRAINING DATA AND SAME CRITERIA CAN BE USED |
| 7 | TREND IN WEIGHTING FACTOR | WHEN WEIGHTING FACTOR OF NAME IDENTIFICATION TARGET ITEM CHANGES IN DIRECTION MATCHING HUMANE IMPRESSION, "○" IS DETERMINED, AND WHEN WEIGHTING FACTOR CHANGES IN DIFFERENT DIRECTION, "×" IS DETERMINED | | k0 k1 k2 k3

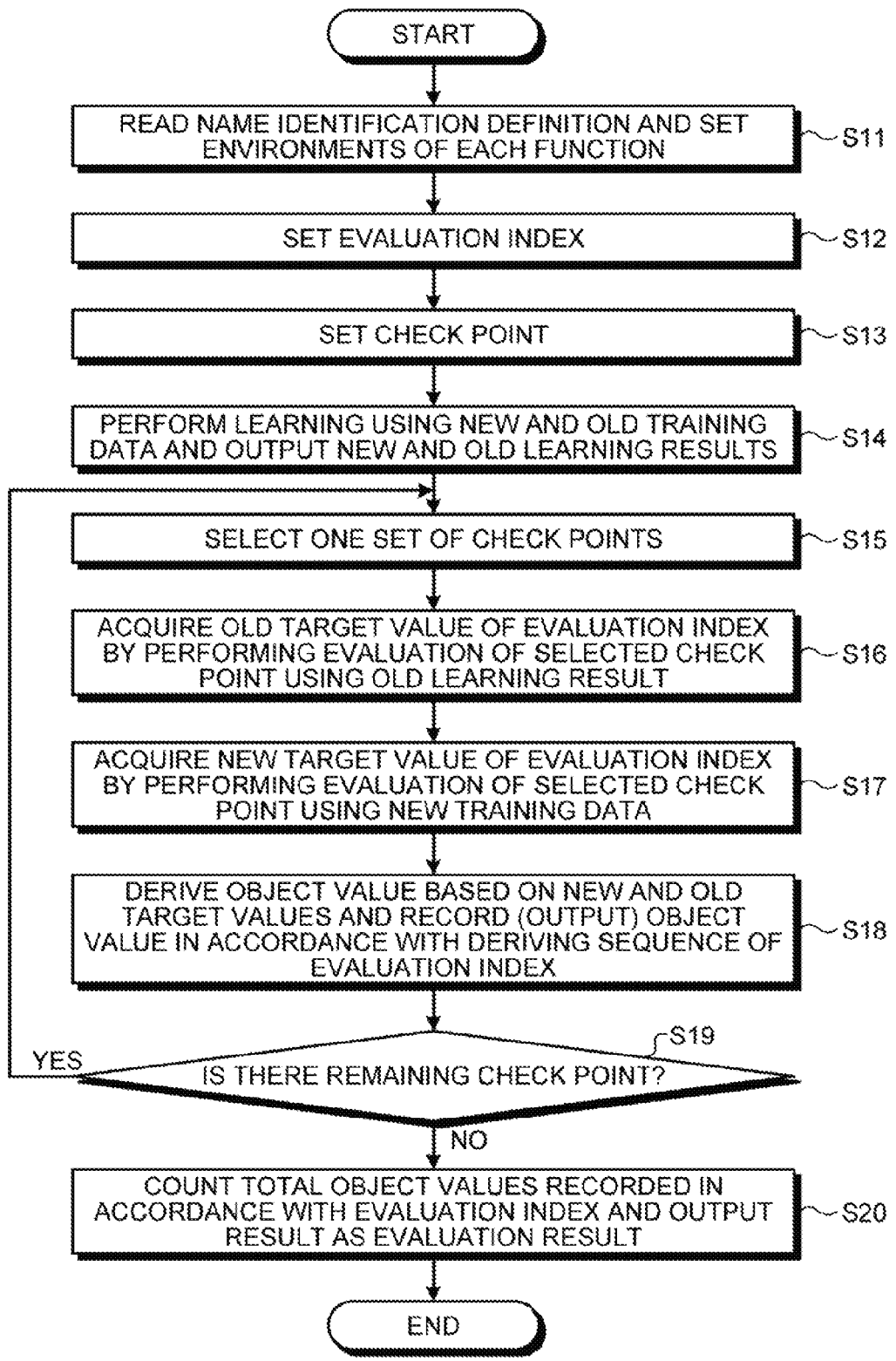

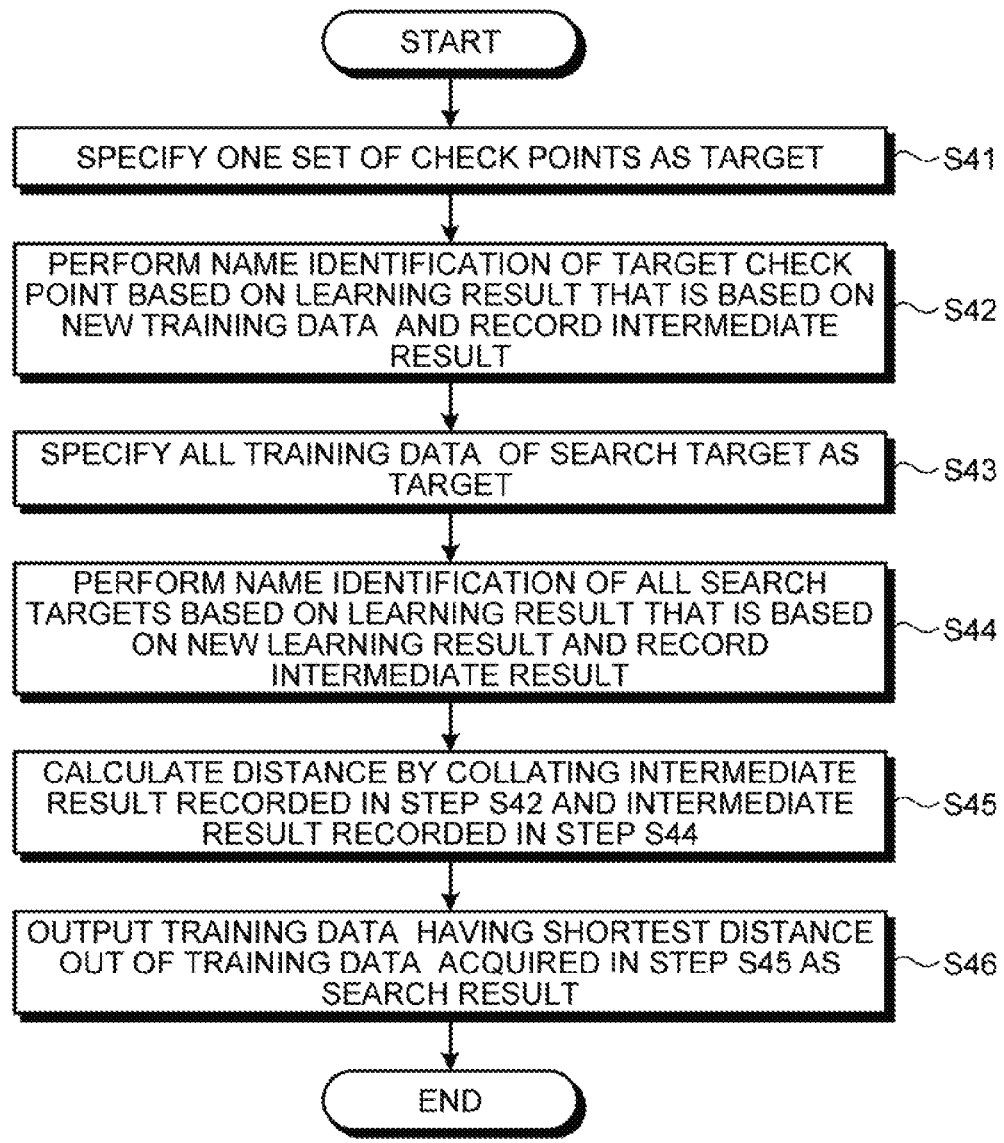

FIG.7G

| No. | ITEM NAME | OLD TRAINING DATA | NEW TRAINING DATA | VARIATION | |
|---|---|---|---|---|---|
| 1 | COMPANY_NAME | 5.281392 | 1.37309 | -3.908302 | ← i1 |
| 2 | COMPANY_NAME_KANA | 0.6769698 | 3.18051 | 2.5035402 | ← i2 |
| 3 | BRANCH | 0.3391912 | 0.0872485 | -0.2519427 | |
| 4 | BRANCH_KANA | 0.125228 | 0.524372 | 0.399144 | |
| 5 | ABBREVIATION | 0.06411801 | 0.418654 | 0.35453599 | |
| 6 | ABBREVIATION_KANA | 0.3054126 | 0 | -0.3054126 | |
| 7 | ZIP_CODE | 3.302568 | 0.570055 | -2.732513 | ← i7 |
| 8 | ADDRESS | 4.782410 | 1.71628 | -3.06613 | ← i8 |
| 9 | STREET_ADDRESS | 0.4650020 | 0.541146 | 0.076144 | |
| 10 | BUILDING_NAME | 0.03228060 | 0.0608873 | 0.0286067 | |

FIG.12
RELATED ART

[NAME IDENTIFICATION TARGET DB]

M

CUSTOMER_TABLE (2 MILLION RECORDS)

| | ID | NAME | ZIP_CODE | ADDRESS | DATE_OF_BIRTH |
|---|---|---|---|---|---|
| M1 | 1000000 | 田中一郎 | 004-0021 | 北海道札幌市AAAA | 1958.8.3 |
| M2 | 1000001 | 鈴木次郎 | 211-0000 | 神奈川県川崎市BBBB | 2003.5.1 |
| M3 | 1000002 | 田中一郎 | 004-0021 | 北海道札幌市CCCC | 1999.3.20 |
| M4 | 1000003 | 田中花子 | 861-2104 | 熊本県熊本市DDDD | 2001.9.15 |
| M5 | 1000004 | 田中一郎 | 004-0021 | 北海道札幌市EEEE | 1958.8.3 |
| M6 | 1000005 | 佐藤三郎 | 151-0064 | 東京都渋谷区FFFF | 1999.3.22 |
| ... | | | | | |

[NAME IDENTIFICATION SOURCE]

| | ID | NAME | ZIP_CODE | ADDRESS | DATE_OF_BIRTH |
|---|---|---|---|---|---|
| M1 | 1000000 | 田中一郎 | 004-0021 | 北海道札幌市AAAA | 1958.8.3 |

2 MILLION RECORDS × 2 MILLION RECORDS=4 TRILLION PAIRS
ENORMOUS PROCESSING TIME IS REQUIRED

[RESULT OF APPLYING EVALUATION FUNCTIONS]

1000000:1000000, 1.0 , 1.0 , 1.0 , 1.0
1000000:1000001, 0.25, 0 , 0 , 0
1000000:1000002, 1.0 , 1.0 , 1.0 , 0.6
1000000:1000003, 0.5 , 0 , 0 , 0
1000000:1000004, 1.0 , 1.0 , 1.0 , 0.6 , 1.0
1000000:1000005, 0.25, 0 , 0 , 0
...

[RESULT OF APPLYING WEIGHTING FACTORS]
WEIGHTING FACTORS 0.3 0.2 0.3 0.2

1000000:1000000, 0.3 , 0.2 , 0.3 , 0.2
1000000:1000001, 0.075, 0 , 0 , 0
1000000:1000002, 0.3 , 0.2 , 0.18, 0
1000000:1000003, 0.15, 0 , 0 , 0
1000000:1000004, 0.3 , 0.2 , 0.18, 0.2
1000000:1000005, 0.075, 0 , 0 , 0
...

[TOTAL EVALUATION VALUE AND JUDGMENT]
THRESHOLD L:0.29 U:0.72

1000000:1000000, 1       White
1000000:1000001, 0.075   Black
1000000:1000002, 0.68    Gray
1000000:1000003, 0.15    Black
1000000:1000004, 0.88    White
1000000:1000005, 0.075   Black
...

INFORMATION MATCHING APPARATUS, METHOD OF MATCHING INFORMATION, AND COMPUTER READABLE STORAGE MEDIUM HAVING STORED INFORMATION MATCHING PROGRAM

CROSS-REFERENCE TO RELATED APPLICATION

This application is a continuation of application Ser. No. 13/307,415, filed Nov. 30, 2011, which claims the benefit of priority of the prior Japanese Patent Application No. 2011-017222, filed on Jan. 28, 2011, the entire contents of which are incorporated herein by reference.

FIELD

The embodiment discussed here is directed to an information matching apparatus, a method of matching information, and an information matching program.

BACKGROUND

Recently, in a variety of fields, supervised learning is used. The supervised learning represents a learning system in which labeled data is learned by a machine learning device as supervised data, and the label of test data is predicted. As a machine learning device of supervised learning, a support vector machine (SVM) is known.

For example, a technique applied to the diagnosis of medical images is disclosed in a medical field, and supervised data as a support vector (SV) is acquired for a category of abnormal shading and a category of normal shading based on supervised data group. Then, an identification function for maximizing a margin area is calculated based on the supervised data as the support vector, and a SVM is built. At this time, it is judged whether or not the supervised data as the SV is an appropriate SV. In a case where it is judged that the supervised data is judged as an inappropriate SV, the supervised data judged as the inappropriate SV is removed, and an SV and an identification function are calculated again.

For records each configured by a set of values, as a function for combining the records and judging the identity, the similarity, and the relevance between the records, there is a name identification function. In the name identification function, for example, a set of records to be identified is referred to as a name identification source, and a set of records that are opponents for identification is referred to as an identification destination. FIG. 9 is a diagram illustrating the name identification function. As illustrated in FIG. 9, in a name identification process that realizes the name identification function, a record that is the same as the name identification source, a record that is similar to the name identification source, or a record that is relevant to the name identification source is detected from the name identification target, and a detection result is output as a result of the name identification process. Relating to the name identification function, there is a technique for name identification that uses supervised learning.

Patent Document 1: Japanese Laid-open Patent Publication No. 2005-198970

First, a conventional name identification function will be described with reference to FIGS. 10 to 12. FIG. 10 is a diagram illustrating the operation of the name identification function. As illustrated in FIG. 10, in a name identification process that realizes the name identification function, each record J1 of the name identification source is collated with records M (M1 to Mn) of the name identification target so that name identification is performed.

In the name identification process, the values of each item of the identification target (referred to as a "name identification item") of the record J1 of the name identification source and a record M1 of the name identification target are collated by applying an evaluation function that is defined for each name identification item thereto. Here, it is assumed that the name identification items include a name, an address, and a date of birth, and, in the name identification process, a matching is made by applying each evaluation function of fa( ) to a name, fb( ) to an address, and fc( ) to a date of birth out of the name identification items. Then, the evaluation value of each name identification item that is derived as a result of the matching is weighted in accordance with the name identification item, and the acquired values are added together, whereby a total evaluation value is derived. In addition, in the name identification process, total evaluation values are derived for all the remaining records M2 to Mn of the name identification target with respect to the record J1 of the name identification source. In each name identification process, a name identification candidate set that includes the total evaluation values for sets of the record J1 of the name identification source and the records M1 to Mn of the name identification target is generated.

Then, in the name identification process, a name identification is judged for sets of records that belong to the name identification candidate set based on thresholds defined in advance. For example, in the name identification process, a set of records that are judged to be completely matched with each other is automatically judged as "White", and a set of records that are judged not to be matched at all is automatically judged as "Black", and the results are output as identification results. In addition, in the name identification process, a set of records that is difficult to automatically judge is judged as "Gray" and is output to a candidate list. Then, the judgment of the set output to the candidate list is assigned to a staff. In addition, as name identification definitions that are need to be set by a staff, there are a selection of name identification items, a selection of evaluation functions, and setting of weighing factors and thresholds.

Next, a detailed example of the name identification process will be described with reference to FIGS. 11 and 12. FIG. 11 is a diagram illustrating an example of the data structure of name identification definitions, FIG. 11(A) illustrates the contents of the name identification definitions, and FIG. 11(B) illustrates a detailed example of the name identification definitions. FIG. 12 is a diagram illustrating a detailed example of the name identification.

As illustrated in FIG. 11(A), in the name identification definition, a name identification method d1, a name identification source designation d2, a name identification target designation d3, a name identification item designation d4, and a threshold d5 are associated with one another for the definition. In the name identification method d1, a method of identifying names is designated. For example, as a method of identifying names, there is a "self name identification" in which name identification is performed between records within a set in a round-robin system with one record set being set as a target, and duplicate records are eliminated by detecting records that match each other. In the self name identification, since the name identification source and the name identification target are the same set, the structures (items of the record) thereof are the same. In addition, as another method of identifying names, there is a "different party name identification" in which name identification is performed on a combination of a name identification source record and a name identification target record, with respect to different sets of the name identification source and the name identification target, records that match each other between the name identification source and the name identification target are detected, and the corresponding records are associated with each other. In the different party name identification, since the name identification source and the name identification target are different sets, generally, the structures (items of records) thereof are different from each other. In the name identification source designation d2, access information of the name identification source such as a database name and items of a record of the name identification source are designated. In the name identification target designation d3, access information of the name identification target such as a database name and items of a record of the name identification target are designated. In the name identification item designation d4, the name identification items are designated as a combination of items of the name identification source and items of the name identification target, and an evaluation function and a weighting factor that are applied to each name identification item are designated. In addition, in the threshold d5, a upper threshold used for judging "White" and a lower threshold used for judging "Black" are designated.

As illustrated in FIG. 11(B), for example, in the name identification method d1, the "self-name identification" is designated. In the access information of the name identification source designation d2, a "customer table" is designated, and, in the record information of the name identification source designation d2, items of an identification (ID), a name, a zip code, an address, and a date of birth are designated. In addition, in a case where the name identification method is the "self-name identification", the name identification target designation d3 is the same as the information of the name identification source, and a definition thereof is not necessary. In the name identification item designation d4, the name identification items are designated as name: name, zip code: zip code, address: address, and date of birth: date of birth. The reason for this is that the name identification item is designated as a set of an item of the name identification source and an item of the name identification target, and in a case where the name identification method is the "self-name identification", the record configurations are the same, and thus, generally, the same item names are designated as the set. For each name identification item, an evaluation function and a weighting factor to be applied are designated. For example, in a case where the name identification item is "name: name", "edit distance" is designated as the evaluation function, and 0.3 is designated as the weighting factor. On the other hand, in a case where the name identification item is "zip code: zip code", "complete matching" is designated as the evaluation function, and 0.2 is designated as the weighting factor. In the threshold d5, 0.72 is designated as the higher threshold, and 0.26 is designated as the lower threshold. Hereinafter, a name identification item in which the same item names are paired will be represented as one item name. For example, "name identification item name: name" is represented as "name identification item name". Here, the "edit distance" is an evaluation function that represents a minimum number of times of editing at the time of transforming the value of the name identification target into the value of the name identification source for a combination of values of the name identification items of the name identification source and the name identification target, as a distance. For example, in a case where a transformation is not necessary, 1.0 is returned, and, in a case where all the transformations are necessary, 0 is returned. On the other hand, in a case where some of the transformations are sufficient, a value in the range of 0 to 1.0 is returned in accordance with the number of the transformations. Here, the "complete matching" is an evaluation function that represents whether or not two values are completely matched with each other for a combination of the values of the name identification items of the name identification source and the name identification target. In a case where the two values are completely matched with each other 1.0 is returned, but otherwise 0 is returned. In addition, the evaluation function is not limited thereto, and there is an "N-gram" that evaluates the degree in which N characters adjacent to each other for the value of the name identification source are included in the value of the name identification target or the like.

FIG. 12 illustrates an intermediate transition and a result of a name identification process with respect to one record M1 of the name identification source and each name identification target, as a part of the name identification process defined in FIG. 11. In the customer table M of the name identification target, for example, two million records are stored. In the name identification process, each one of the records is used as a name identification target and collated with the record M1 of the name identification source. For example, in the name identification process, as an intermediate result of the matching, for each set of the record M1 of the name identification source and records M1 to M6 of the name identification target, a result of applying the evaluation function, a weighting result, and a total evaluation value are output with being associated with one another. Then, in the name identification process, after the matching, for each set of the record M1 of the name identification source and the records M1 to M6 of the name identification target, the judgment on the name identification is made, and the judgment results are output.

Next, the name identification function performed by a machine learning unit corresponding to a machine learning device will be described with reference to FIG. 13. FIG. 13 is a diagram illustrating name identification that is performed by the machine learning unit. As illustrated in FIG. 13, in the name identification process that realizes the name identification function, a machine learning unit that realizes supervised learning is provided. The machine learning unit acquires a training data that is supervised data representing an example of a record pair that represents a positive judgment result and learns judgment criteria used in the name identification process using the acquired training data. These judgment criteria are used as a threshold that is applied to the weighting of each name identification item and the judgment of a name identification target record.

Then, in the name identification process, a record of the name identification source is combined with a record of the name identification target, and a judgment of the name identification is made by using the judgment criteria acquired by the machine learning device, and the judgment result is output. At this time, in the name identification process, a set that is difficult to automatically judge for the name identification is output to the candidate list so as to be given over to a judgment made by a staff. Then, for the set output to the candidate list, by appropriately feeding back a training data in accordance with the judgment made by a staff, the name identification process realizes a high-accuracy judgment through supervised learning.

However, in a name identification process performed by a conventional machine learning device, there is no unit that verifies the validness of a training data or a contradiction between training datas, and accordingly, it is difficult to generate an appropriate training data and apply appropriate feedback to the training data.

In addition, in the name identification process performed by a conventional machine learning device, since there is no unit that evaluates incorrect learning, it is difficult to prevent the quality of the judgment result of a name identification from being degraded. In other words, in a case where the machine learning device performs incorrect learning (erroneous learning) based on an incorrect training data or performs incorrect learning (over-learning) based on biased training datas due to addition of biased training datas in a large scale, it is difficult to detect the degradation of correctness of the judgment result of the name identification. As a result, it is difficult to prevent the quality of the judgment result of the name identification from being degraded.

SUMMARY

According to an aspect of an embodiment of the invention, an information matching apparatus includes a processor, a memory. The processor executes setting supervised data in a machine learning device of supervised learning that learns judgment criteria used for a judgment of identicalness, similarity, and relevance between a plurality of records by matching the records configured by sets of values corresponding to items, setting a check point configured by one set of two records used for evaluating the supervised data set at the setting supervised data; and evaluating, for the check point set at the setting a check point, by acquiring a change between a judgment result using judgment criteria derived as a result of learning based on first supervised data set at the setting supervised data and a judgment result using judgment criteria derived as a result of learning based on second supervised data set at the setting supervised data and by evaluating the supervised data based on the acquired change.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating a specific example of an evaluation index according to an embodiment;

FIG. 4 is a diagram illustrating a specific example of the reflection of an evaluation result for each evaluation index;

FIG. 6A is a flowchart illustrating a learning result evaluating process according to an embodiment;

FIG. 6C is a flowchart illustrating a neighbor training data searching process according to an embodiment;

FIG. 7G is a diagram illustrating a specific example of the reflection of an evaluation result in a case where the evaluation index is "trend in the weighting factor" of item no. "7";

FIG. 12 is a diagram illustrating a specific example of the name identification;

DESCRIPTION OF EMBODIMENT

Preferred embodiments of the present invention will be explained with reference to accompanying drawings. In the following embodiment, a case will be described in which a support vector machine (SVM) is used as a machine learning device that allows the information matching apparatus to perform supervised-learning, and before the description of the embodiment is presented, a name identification technique using the SVM will be described. However, the invention is not limited to the embodiment.

Name Identification Technique Using SVM

Figure 14:
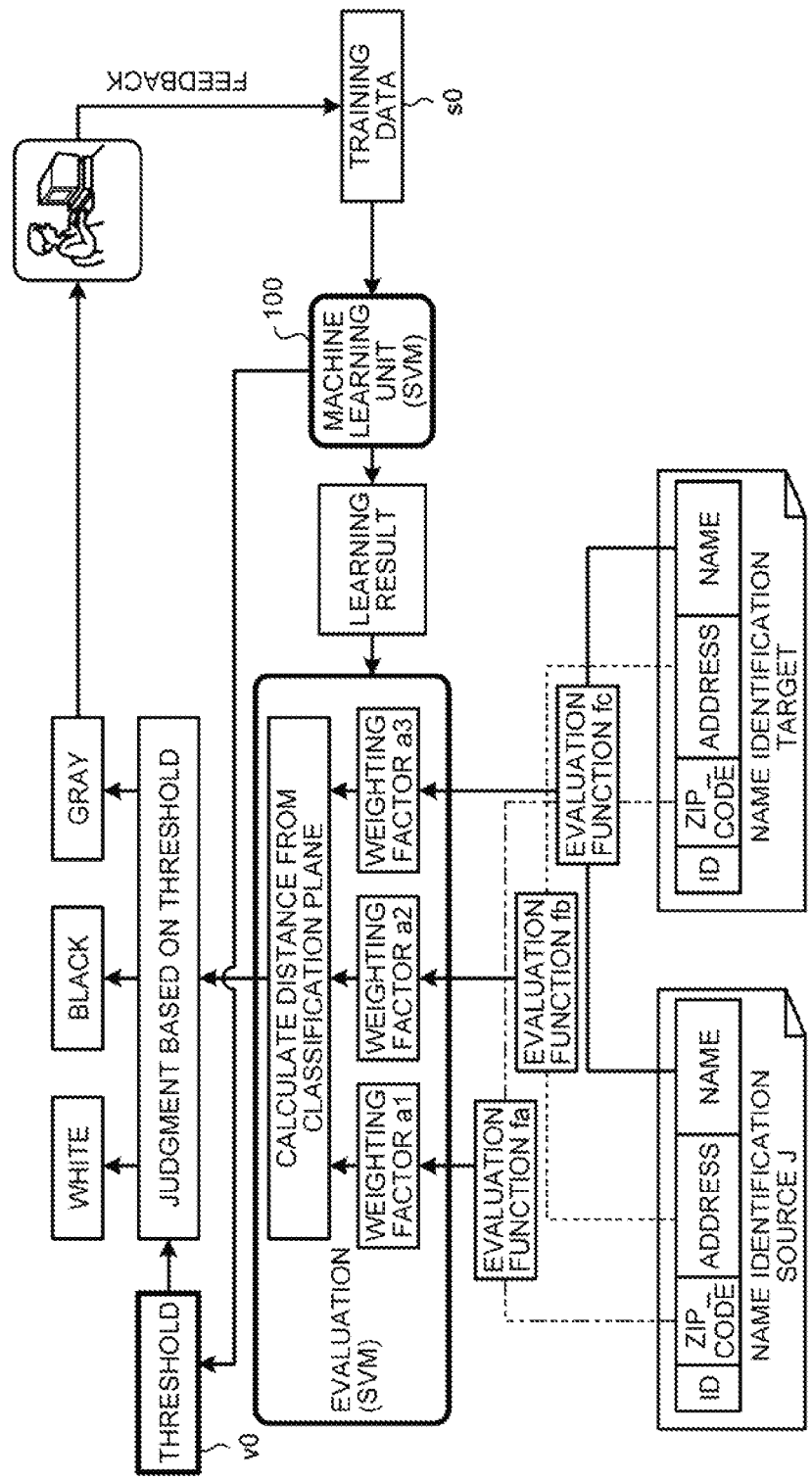
FIG. 14 is a diagram illustrating a matching through learning.

FIG. 14 is a diagram illustrating a matching through leaning. As illustrated in FIG. 14, a learning unit (SVM) 100 performs learning through a training data s0 by using results (evaluation values) of evaluation functions fa to fc for each name identification item as attributes and derives weighting factors a1 to a3 for each evaluation value as an attribute and a threshold v0 used for judging a total evaluation value by acquiring a classification hyperplane. The SVM 100 outputs the weighting factors a1 to a3 and the threshold v0 that have been derived as a learning result. Then, in a name identification process, a name identification is performed for a name identification source J by using a learning result of a name identification target M. In other words, in the name identification process, a matching is performed by using the weighting factors a1 to a3 that are output as learning results for each name identification item, and a total evaluation value, which is acquired as a matching result, as a judgment target is calculated as a distance from the classification hyperplane derived through learning, and a judgment is made for the total evaluation value based on the threshold. The classification hyperplane will be described later.

Figure 15:
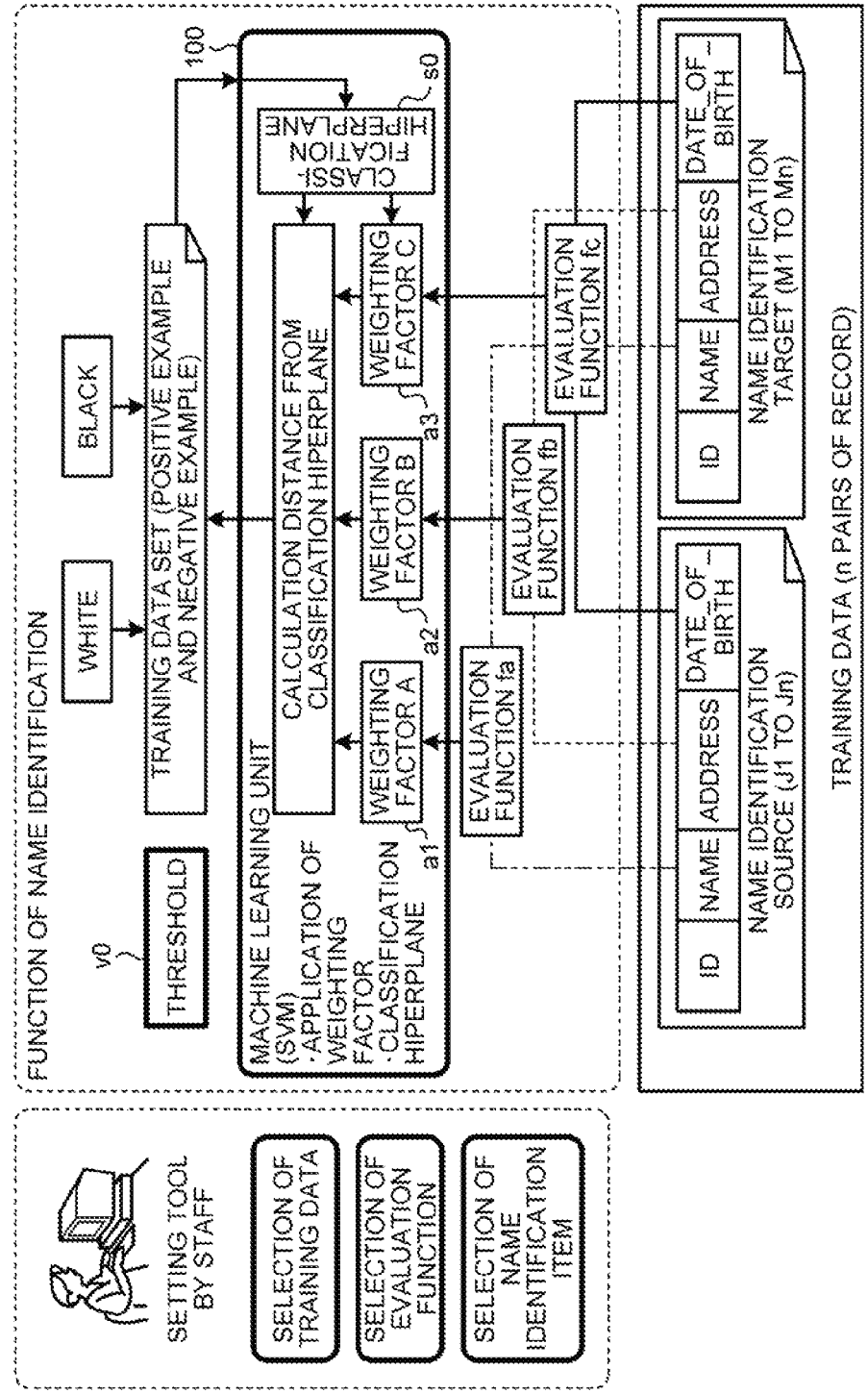
FIG. 15 is a diagram illustrating a learning process of an SVM.

Next, the learning process of the SVM 100 will be described in more detail. FIG. 15 is a diagram illustrating the learning process of the SVM. As illustrated in FIG. 15, a set of training datas is input to the SVM 100, in which a set of records to be judged to match each other is set to a training data of a positive example, and a set of records to be judged not to match each other is set as a training data of a negative example. Then, the SVM 100 evaluates values of the name identification items of the name identification source J and the name identification target M based on the evaluation functions fa to fc using training datas belonging to the training data set that is input and derives judgment criteria that realize a judgment that matches a judgment result (positive example=White, and negative example=Black) that is given in advance as the training data at the time of judging the results (evaluation values) acquired through the evaluation. The derived judgment criteria are the weighting factors a1 to a3, the classification hyperplane s0, and the threshold v0 for each name identification item. Since the SVM 100 derives the weighting factors a1 to a3 and the threshold v0, the weighting factors and the threshold do not need to be set by a staff. As a result, according to the name identification function, a name identification can be performed by referring to the training datas. As name identification definitions that are needed to be set by a staff, there are selection of name identification items, selection of evaluation functions, and selection of a training data.

Figure 16:
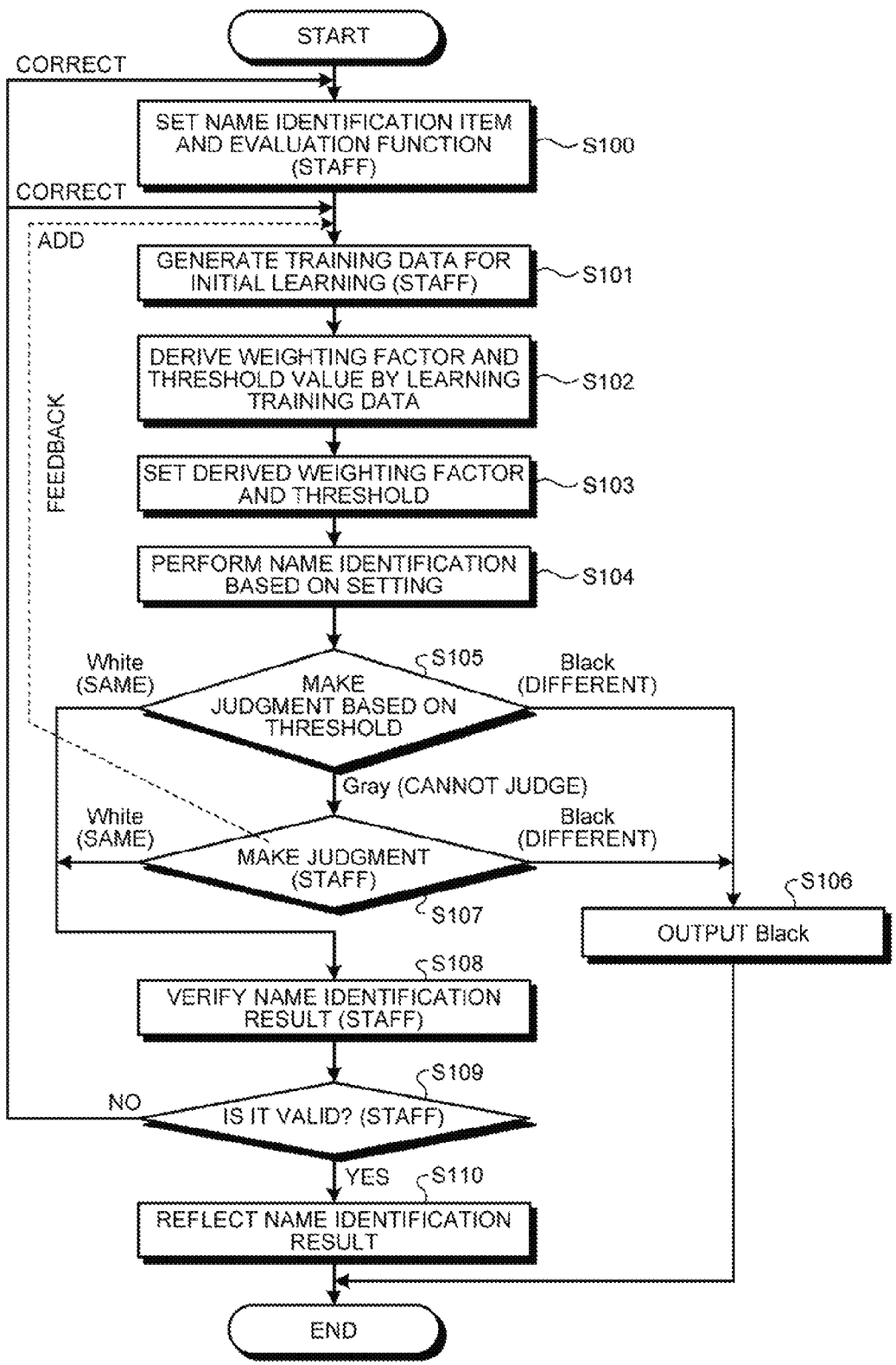
FIG. 16 is a flowchart illustrating the processing sequence of the name identification process through learning.

Next, the processing sequence of the name identification process through learning will be described with reference to FIG. 16. FIG. 16 is a flowchart illustrating the processing sequence of the name identification process through learning.

First, a staff (for example, a user) sets name identification items and evaluation functions for each name identification item in Step S100. Then, the user generates training datas for initial learning in Step S101. In other words, the user generates training datas as positive examples and training datas as negative examples.

Subsequently, the SVM 100 performs learning by using the generated training datas and derives the weighting factors and the threshold in Step S102. Then, the SVM 100 sets the weighting factors and the threshold that have been derived as a result of the learning in the name identification process in Step S103.

Subsequently, in Step S104 of the name identification process, a name identification is performed based on the weighting factors and the threshold that have been set. Then, in the name identification process, a judgment is made based on the set threshold for a total evaluation value that represents the result of the name identification in Step S105. In a case where the judgment made based on the threshold represents different (no matching) (Black in Step S105), the result of the name identification is output as Black in Step S106. On the other hand, in a case where the judgment made based on the threshold represents same (matching) (White in Step S105), the name identification process proceeds to Step S108.

In a case where it cannot judge to make a judgment based on the threshold (Gray in Step S105), in the name identification process, the judgment is left to the user in Step S107. In a case where the judgment made by the user represents different (no matching) (Black in Step S107), the user allows the process to proceed to Step S106 for setting the result of the name identification to Black. On the other hand, in a case where the judgment made by the user represents same (matching) (White in Step S107), the name identification process proceeds to Step S108. Here, in a case where a feedback to the training data is done, for the feedback of the result of the name identification, the user allows the process to proceed to Step S101. At this time, a set judged to be different (Black) is registered in the training data of a negative example, and a set judged to be same (White) is registered in the training data of a positive example.

Subsequently, the user verifies the result of the name identification that has been judged to same in Step S108. Then, the user judges whether or not the result of the name identification that has been judged to same is valid in Step S109. In a case where the result of the name identification is judged not to be valid (No in Step S109), in order to modify the name identification items, the evaluation functions, or the training data, the process proceeds to Step S100 or Step S101. On the other hand, in a case where the result of the name identification is judged to be valid (Yes in Step S109), the result of the name identification is reflected on the name identification target and the like in Step S110. Here, in a case where the output of the set judged to be Black is not necessary, Step S106 may be omitted.

Next, a learning model using an SVM as an example will be described. First, assumptions describing a learning model will be described. For a set of records as name identification targets, the result of calculation using the evaluation function for each name identification item is represented as an attribute x so as to form a vector (x1, . . . , xd) referred to as a "feature vector". For example, it is assumed that there are four name identification items including a name, a zip code, an address, and a date of birth, and the evaluation functions of the name, the address, the zip code, and the date of birth are fa( ), fb( ), fc( ), and fd( ). Then, in this example, d is "4", and the feature vector is (an evaluation value acquired based on fa( ), an evaluation value acquired based on fb( ), an evaluation value acquired based on fc( ), and an evaluation value acquired based on fd( ).

Here, in a case where a feature vector $X^T$ is $(x_1, \ldots, x_d)$, a classification hyperplane g(x) is defined as in Equation (1).

$$g(x) = \sum_{j=1}^{d} w_j x_j + b = W^T \cdot X + b \qquad (1)$$

Here, W denotes a weighting vector and is represented as $(w_1, \ldots, w_d)$ that is configured by weighting factors for each attribute. In addition, b denotes a constant term.

In addition, as learning sample data (training data), the following information is given.

$$(Z_1, y_1), \ldots, (Z_i, y_i), \ldots, (Z_l, y_l) Z_i \epsilon R^n y_i \epsilon \{+1, -1\} \qquad (2)$$

Here, $Z_i$ is a feature vector of each training data and is an element of a combined set $R^n$ of name identification matchings. In addition, $y_i$ is a judgment result of the name identification and, for example, is +1 in the case of a positive example and is −1 in the case of a negative example. In other words, in a case where the judgment result of the name identification is regarded to be the same (White judgment), +1 is defined as a positive example. On the other hand, in a case where the judgment result of the name identification is regarded to be different (Black judgment), −1 is defined as a negative example.

Under such assumptions, a learning process in a learning model represents acquiring a classification hyperplane that has a set of points satisfying $g(x)=0$ as a hyperplane when a plurality of training datas are given. In other words, in order to derive a classification hyperplane as a (d−1)-dimension hyperplane used for separating (identifying) training datas distributed in a d-dimension space such that a positive judgment result or a negative judgment result, which is designated in advance, is acquired for each training data, a weighting factor vector wi ($1 \leq i \leq d$) and a constant term b of the classification hyperplane $g(x)$ are derived in the learning process.

Figure 17:
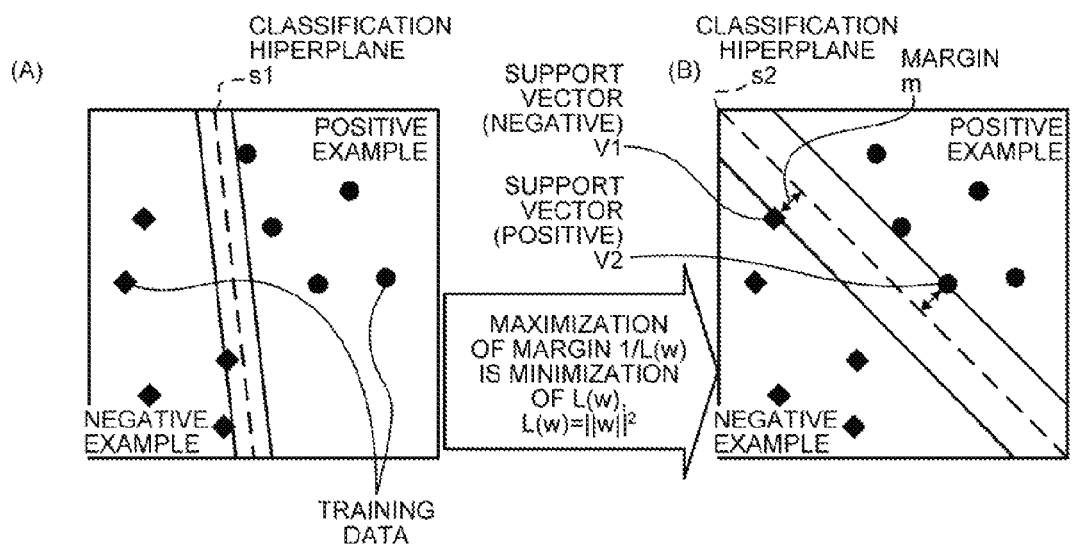
FIG. 17 is a diagram illustrating a learning model (an example of an SVM)

FIG. 17 is a diagram illustrating a learning model (an example of an SVM). As illustrated in FIG. 17(A), when a training data as a positive example and a training data as a negative example are given, the SVM performing a learning process plots the feature vector of each training data in a d-dimension space. Since FIG. 17 is a two-dimension diagram, a case is illustrated in which there are two name identification items. The SVM acquires a classification hyperplane s1, which is used for identifying each training data, for acquiring a result that coincides with the positivity or negativity of each training data. Here, an effective training data that is close to the classification hyperplane is referred to as a "support vector". By selecting a support vector and deriving a hyperplane such that a minimum distance (margin) between the classification hyperplane and the support vector in an Euclid space is maximized, the SVM derives a classification hyperplane that can identify the positivity or negativity of each training data more reliably.

As illustrated in FIG. 17(B), the SVM selects a negative support vector V1 and a positive support vector V2 such that a margin m between the classification hyperplane and the support vector can be maximized and derives a classification hyperplane s2. Described in more detail, the maximizing of the margin m represents that a weighting factor W maximizing the feature vector X is acquired when the total evaluation value is 1 (=$W^T \cdot X+b$). When b is assumed to be zero, x is 1/W. Accordingly, in order to maximize the feature vector X, the weighting factor W is minimized. Described in more detail, since the margin m of a case illustrated in FIG. 17(A) is larger than that of a case illustrated in FIG. 17(B), the SVM derives the classification hyperplane as illustrated in FIG. 17(B).

When the SVM derives a classification hyperplane so as to maximize the margin, there is a case where it is difficult to linearly classify a training data. In other words, there is a case where a training data does not coincide with its positivity or negativity. Even in such a case, the SVM allows an identification error to some degree and uses a method (called a soft margin) in which a classification hyperplane is derived so as to maximize the margin while minimizing the identification error.

Figure 18:
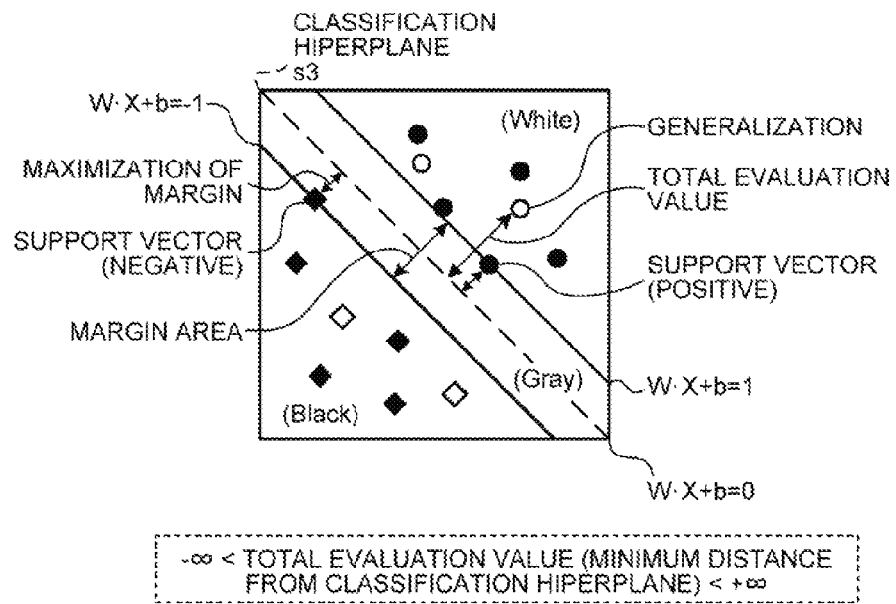
FIG. 18 is a diagram illustrating the effect of learning.

As described above, through the learning process of the SVM, a classification hyperplane and a maximized margin can be acquired as the result of the learning process. By using this result of the learning process, the evaluation of a name identification can be performed for the feature vector of a set of records as the name identification target. FIG. 18 is a diagram illustrating the effect of learning. As illustrated in FIG. 21, in the learning process, in order to maximize the margin, a classification hyperplane s3 on which $W \cdot X + b = 0$ is derived, and a negative limit plane on which $W \cdot X + b = -1$ and a positive limit plane on which $W \cdot X + b = 1$ are selected. A total evaluation value that is calculated based on the feature vector X, the weighting factor W, and the constant b is represented as a value in the range of −∞ to +∞ as a minimum distance between the feature vector and the classification hyperplane s3. The total evaluation value of the support vector as supervised data that is in contact with the positive limit plane is +1, and the total evaluation value as supervised data that is in contact with the negative limit plane is −1. Accordingly, in the name identification process, when the total evaluation value of the feature vector of a set of records as the name identification target other than the supervised data by using the weighting factor W and the constant b as the result of the learning is calculated (a mark ○ or a mark ◇ illustrated in FIG. 18), White, Black, or Gray can be judged based on the calculated total evaluation value. This feature is called generalization and is a distinctive feature of the SVM. In other words, White is judged in a case where the total evaluation value is +1 or more, Black is judged in a case where the total evaluation value is less than −1 (the direction of −∞), and Gray is judged in a case where the absolute value of the total evaluation value is less than one, whereby a judgment can be realized which matches the training data.

In addition, the above-described total evaluation value is calculated based on the feature vector X, the weighting factor W, and the constant b, and although the principle of the SVM is described in which thresholds are fixed values as an upper limit threshold=$W \cdot X + b = +1$ and a lower limit threshold=$W \cdot X + b = -1$, by moving the constant term b to the right side, the thresholds can be variable values as an upper limit threshold=$W \cdot X = +1 - b$ and a lower limit threshold=$W \cdot X = -1 - b$. In such a case, the total evaluation value can be calculated as $W \cdot X$, and the thresholds can be calculated as the upper limit threshold=$+1-b$, and the lower limit threshold=$-1-b$.

In the embodiment illustrated below, an information matching apparatus, a method of matching information, and an information matching program that use a learning process of the SVM will be described.

Configuration of Information Matching Apparatus According to Embodiment

Figure 1:
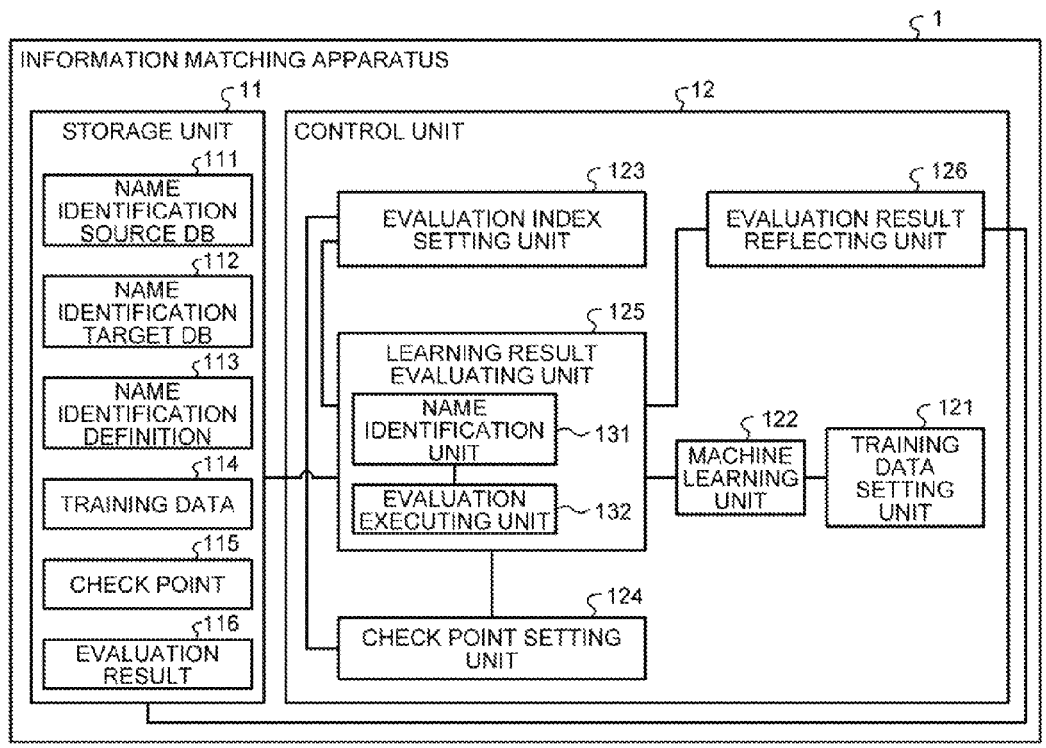
FIG. 1 is a functional block diagram illustrating the configuration of an information matching apparatus according to an embodiment.

FIG. 1 is a functional block diagram illustrating the configuration of an information matching apparatus according to an embodiment. An information matching apparatus 1 is an apparatus that collates records for a plurality of records that are configured by a set of values corresponding to items and judges the identity, the similarity, and the relevance between the records. As illustrated in FIG. 1, the information matching apparatus 1 includes a storage unit 11 and a control unit 12.

The storage unit 11 includes a name identification source DB 111, a name identification target DB 112, a name identification definition 113, a training data 114, a check point 115, and an evaluation result 116. Here, the storage unit 11 is a storage device including a semiconductor memory device such as a random access memory (RAM) or a flash memory, a hard disk, or an optical disc.

The name identification source DB 111 is a database (DB) that stores a plurality of records (name identification source records) for which a name is identified. The name identification target DB 112 is a DB that stores a plurality of records (name identification target records) that are opponents of the name identification. Here, items of the name identification source DB 111 and the name identification target DB 112 may be completely matched with each other, partially matched with each other, or not matched with each other at all, or some items thereof may have relevance. In addition, the name identification source DB 111 and the name identification target DB 112 may be DBs that have the same types of information or may be one DB. Furthermore, the name identification source DB 111 may not necessarily be a DB but may be an XML file, a CSV file, or the like as long as it has a sequential record fetching function. Similarly, the name identification target DB 112 may not necessarily be a DB but may be an XML file, a CSV file, or the like as long as it has a sequentially record fetching function and a search function using a key (ID).

The training data 114 is supervised data judged in advance as one set of a name identification source record and a name identification target record of which the name identification result is self-evident, and there are a training data of a positive example that represents that the name identification result is matching and a training data of a negative example that represents that the name identification result is nomatching. In addition, not only a latest training data (new training data) but a training data (old training data) in the past that is used for the comparison evaluation is stored.

The check point 115 is a sample used for evaluating the training data 114 and is defined for each set of a name identification source record and a name identification target record. In addition, the name identification definition 113 and the evaluation result 116 will be described later.

The control unit 12 performs evaluation of a name identification for a check point used for evaluating a training data used in a learning process by using a learning result that is derived by supervised learning. Then, the control unit 12 monitors a change in the evaluation result and evaluates "good" or "bad" of the learning result.

Figure 2:
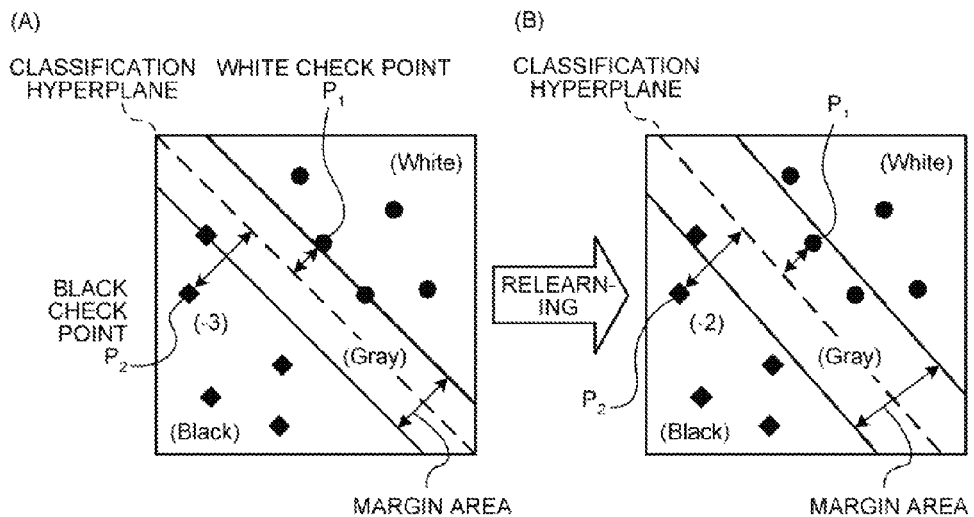
FIG. 2 is a diagram illustrating the principle of a learning result evaluating process according to an embodiment.

Here, the principle of a learning result evaluating process performed by the control unit 12 will be described with reference to FIG. 2. FIG. 2 is a diagram illustrating the principle of the learning result evaluating process according to an embodiment. As illustrated in FIG. 2, in the learning result evaluating process performed by the control unit 12, a judgment result of a name identification judged by using the learning result learned using one training data (old training data) for a specified check point $P_1$ of White is calculated. In addition, in the learning result evaluating process, a judgment result of a name identification judged by using a learning result relearned by using a new training data that is a training data different from the old training data for the same check point $P_1$ is calculated. Since the classification hyperplane and the margin area (a limit surface between positive and negative judgments) change in accordance with the relearning, the total evaluation value and the judgment for the same check point $P_1$ also change. Then, in the learning result evaluating process, since "White" representing the judgment result that is based on the old training data changes to "Gray" representing the judgment result that is based on the new training data, the check point $P_1$ of White is judged as a bad change. In other words, in the learning result evaluating process, it is evaluated that the learning result learned using the new training data is worse than the learning result learned using the old training data.

In addition, in the learning result evaluating process performed by the control unit 12, a judgment result of a name identification judged by using one training data (old training data) for a specified check point $P_2$ of Black is calculated. Furthermore, in the learning result evaluating process, a judgment result of a name identification judged by using a learning result relearned by using a new training data that is a training data different from the old training data for the same check point $P_2$ is calculated. Then, in the learning result evaluating process, for the check point $P_2$ of Black, although both the judgment result acquired by using the old training data and the judgment result acquired by using the new training data are "Black", the total evaluation value changes from "−3" to "−2" in a direction closer to the classification hyperplane, whereby a bad judgment is judged. In other words, in the learning result evaluating process, it is evaluated that the learning result learned using the new training data is worse than the learning result learned using the old training data. As above, in the learning result evaluating process, for a check point, the change in judgment results for the new and old training datas is monitored, and a change in a good direction or a change in a bad direction is judged, thereby evaluating the new training data and the learning result acquired by using the new training data as good or bad.

By referring back to FIG. 1, the control unit 12 includes a training data setting unit 121, a machine learning unit 122, a check point setting unit 124, an evaluation index setting unit 123, a learning result evaluating unit 125, and an evaluation result reflecting unit 126. The control unit 12 is an integrated circuit such as an application specific integrated circuit (ASIC) or a field programmable gate array (FPGA) or an electronic circuit such as a central processing unit (CPU) or a micro processing unit (MPU).

The training data setting unit 121 sets a training data in a machine learning device that learns judgment criteria used for judging a result of the name identification. In this example, the machine learning device corresponds to the machine learning unit 122 to be described later and serves as an SVM. The training data setting unit 121 acquires training datas as evaluation targets of the learning result evaluating unit 125 from the training data 114 and sets a plurality of acquired training datas in the machine learning unit 122.

The machine learning unit 122 acquires the training datas from the training data setting unit 121 and learns judgment criteria used in the name identification process by using the acquired training datas. These judgment criteria are weighting factors for each name identification item and thresholds applied to the judgment of the name identification target. In addition, the machine learning unit 122 derives the learned judgment criteria as a learning result.

The evaluation index setting unit 123 sets an evaluation technique used for evaluating a training data as an evaluation index. Such an evaluation index defines an evaluation technique that includes three elements of an evaluation target value (target value) used for evaluation, an evaluation object (object value) to be driven, and a sequence for deriving the object value from the target value (derivation sequence). Here, a specific example of the evaluation index will be described with reference to FIG. 3. FIG. 3 is a diagram illustrating a specific example of the evaluation index according to an embodiment. In FIG. 3, an evaluation index name h1, a target value h2, an object value h3, and a derivation sequence h4 are associated with each item no h0. In addition, examples of the evaluation index will be described later as a "sequence of learning result evaluating process according to an embodiment".

For example, in a case where the item number h0 is "1", the evaluation index name h1 is an "accuracy rate of the judgment result". This is an evaluation index used for evaluating the correctness of an average judgment result. In this case, the judgment result (White, Gray, or Black) of the name identification for a check point is set as a target value h2. Then, based on the derivation sequence h4, a ratio of check points judged to be correct is calculated by detecting a difference between the judgment result and an expected value of the name identification result that is set in advance for each check point at the time of setting the check point, whereby the "accuracy rates of the judgment results" using the new and old training datas as object values h3 are calculated.

In addition, in a case where the item number h0 is "2", the evaluation index name h1 is a "change in the classification hyperplane". This is an evaluation index used for evaluating the correctness of the change in the classification hyperplane based on the judgment results of check points near the limit surface. In this case, the judgment result of the name identification for the check point is set as the object value h2. Then, in accordance with the derivation sequence h4, the amount of change in the judgment results judged by using the learning results based on the new and old training datas for the judgment results (White, Gray, and Black) is statistically calculated, whereby the "change in the judgment results" based on the new and old training datas as an object value h3 is calculated.

Furthermore, in a case where the item number h0 is "3", the evaluation index name h1 is a "judgment of a significant point". This is an evaluation index for an especially significant check point that is used for checking that the judgment result matches with the expected value all the time. In this case, for a significant check point of which the judgment result needs to be a specific judgment result in a reliable manner, the judgment result of the name identification for the specific check point is set as the object value h2. Then, in accordance with the derivation sequence h4, the "judgment result" regarding whether the judgment results (White, Gray, or Black) judged by using the new and old training datas match with the judgment result set in advance is calculated as the object value h3.

In addition, in a case where the item number h0 is "4", the evaluation index name h1 is a "trend of the individual change in the judgment results". This is an evaluation index used for acquiring a change in the judgment results based on the new and old training datas for each check point. In this case, the judgment result of the name identification for each check point is set as the target value h2. Then, in accordance with the derivation sequence h4, the "trend of the individual change in the judgment results" as a target value h3 is calculated for the judgment results judged by using the learning results based on the new and old training datas. In other words, in the derivation sequence h4, a change in the judgment result from the judgment result based on the old training datas to the judgment result based on the new training datas is acquired.

Furthermore, in a case where the item number h0 is "5", the evaluation index name h1 is a "trend in the total evaluation value". This is an evaluation index used for acquiring a detailed change in the judgment results based on the new and old training datas for each check point. In this case, the total evaluation value of a judgment result of the name identification for each check point is set as the target value h2. Then, in accordance with the derivation sequence h4, a "difference in the total evaluation values" as a target value h3 is calculated for the total evaluation values calculated by using the learning results based on the new and old training datas.

In addition, in a case where the item number h0 is "6", the evaluation index name h1 is a "highest value of the total evaluation values". This is an evaluation index used for acquiring a change in the margin according to the new and old training datas as a change in the highest value of the total evaluation values. In this case, the total evaluation value of the judgment result of the name identification for each check point is set as the target value h2. Then, in accordance with the derivation sequence h4, the "change in the highest value of the total evaluation values" as the target value h3 is calculated for the highest values of the total evaluation values of the judgment results judged by using the learning results based on the new and old training datas.

For example, in a case where the item number h0 is "7", the evaluation index name h1 is a "trend in the weighting factor". In this case, the learning results (weighting factors) based on the new and old training datas are set as the target value h2. Then, in accordance with the derivation sequence h4, a "difference in the weighting factors" as the target value h3 is calculated for each learning result (weighting factor) based on the new and old training datas, and a weighting factor for which the difference is large is detected. Here, the derivation sequence h4 for deriving the object value h3 from the target value h2 is performed by an evaluation executing unit 132.

Referring back to FIG. 1, the check point setting unit 124 sets a check point used for evaluating the training data based on the evaluation index set by the evaluation index setting unit 123. In other words, the check point setting unit 124 sets a check point that is a check point used for evaluating the judgment criteria learned by the machine learning unit 122 and evaluating the training data used at the time of deriving the judgment criteria and is appropriate for the evaluation index. More specifically, the check point setting unit 124 acquires an appropriate check point that is appropriate for the evaluation index set by the evaluation index setting unit 123 from the check point 115 stored in the storage unit 11 and sets the acquired check point in the learning result evaluating unit 125 to be described later.

For example, in a case where the evaluation index is the "accuracy rate of the judgment result" of the item number "1", in order to accurately calculate the accuracy rate, the check point setting unit 124 sets a check point, of which the judgment result can be clearly judged, that is randomly sampled. For example, in a case where the evaluation index is the "change in the classification hyperplane" of the item number "2", the check point setting unit 124 sets a check point that is located near the support vector of the classification hyperplane (the limit surface) acquired by learning a preceding old training data.

For example, in a case where the evaluation index is the "judgment of a significant point" of the evaluation index "3", the check point setting unit 124 sets a set of records for which a specific judgment result needs to be reliably acquired as a check point. For example, in a case where the evaluation index is the "trend of the individual change in the judgment results" of the item number "4", the check point setting unit 124 sets check points that are sampled such that the total evaluation values of the judgment results judged by using the learning result based on the preceding old training data are random.

For example, in a case where the evaluation index is the "trend in the total evaluation value" of the evaluation index "5", the check point setting unit 124, similarly to the case of the "trend of the individual change in the judgment results" described above, sets a check point. For example, in a case where the evaluation index is the "highest value of the total evaluation values" of the item number "6", the check point setting unit 124 sets a check point of records of which the total evaluation value of the judgment result judged by using the learning result based on the preceding old training data is large. For example, in a case where the evaluation index is the "trend in the weighting factor" of the index number "7", any check point is not used, and accordingly, the check point setting unit 124 does not operate. In addition, for any evaluation index, in order to decrease the cost for generating the check point, the check point setting unit 124 may set a check point from among the training datas 114.

The learning result evaluating unit 125 acquires a change in the judgment result by using the learning result based on the old training data set by the training data setting unit 121 and the judgment result using the learning result based on the new training data set by the training data setting unit 121. In addition, the learning result evaluating unit 125 includes a name identification unit 131 and the evaluation executing unit 132.

The name identification unit 131 performs a name identification by using the learning result that is acquired through a learning process of the machine learning unit 122 for the check point, thereby calculating the judgment result. More specifically, the name identification unit 131 performs a name identification by using the old learning result learned by the machine learning unit 122 using the old learning example and the name identification definition 113 for the check point set by the check point setting unit 124, thereby calculating a judgment result. In addition, the name identification unit 131, for the same check point, performs a name identification by using the new learning result learned by the machine learning unit 122 using the new training data and the name identification definition 113, and thereby calculating the judgment result. In the judgment result, a judgment of White regarded as matching, other than a judgment of Black regarded as no-matching, or a judgment of Gray regarded to be undeterminable, a total evaluation value is included.

The evaluation executing unit 132 acquired a target value of the evaluation index set by the evaluation index setting unit 123 from the name identification unit 131 and calculates an object value of the evaluation index by applying the derivation sequence corresponding to the evaluation index to the acquired target value. In addition, the evaluation executing unit 132 stores the calculated object value of the evaluation index in the evaluation result 116. Furthermore, in the evaluation result 116, the object value defined for each evaluation index is stored in association with related information such as the training data used for the evaluation or the check point.

For example, in a case where the "accuracy rate of the judgment result" of the item number "1" is set as the evaluation index, the evaluation executing unit 132, for a plurality of check points for which the name identification results of matching or no-matching are known in advance, acquires the judgment result based on the new training data and the judgment result based on the old training data as target values. In addition, the evaluation executing unit 132, for the plurality of check points, compares expected values of the name identification results that are known in advance and the judgment results based on the old training data, calculates the accuracy rate according to the old training data based on the comparison result, and sets the calculated accuracy rate as the object value. Further, the evaluation executing unit 132, for the plurality of check points, compares expected values of the name identification results that are known in advance and the judgment results based on the new training data, calculates the accuracy rate according to the new training data based on the comparison result, and sets the calculated accuracy rate as the object value. Then, the evaluation executing unit 132 stores the calculated object values according to the new and old training datas in the evaluation result 116.

For example, in a case where the "change in the classification hyperplane" of the item number "2" is set as the evaluation index, the evaluation executing unit 132, for a plurality of check points, acquires the judgment results based on the new training data and the judgment results based on the old training data as target values. In addition, the evaluation executing unit 132, for the plurality of check points, calculates the number of check points for each judgment result based on the old training data and the number of check points for each judgment result based on the new training data and sets the numbers of check points as object values. In other words, the evaluation executing unit 132, sets calculation results of the number of check points judged as the judgment of White, the number of check points judged as the judgment of Black, and the number of check points judged as a judgment of Gray for the new and old training datas as object values. Then, the evaluation executing unit 132 stores the calculated object values according to the new and old training datas in the evaluation result 116.

For example, in a case where the "judgment of a significant point" of the evaluation index "3" is set as the evaluation index, the evaluation executing unit 132, for a check point for which the name identification result is known in advance, acquires the judgment result based on the new training data and the judgment result based on the old training data as target values. In addition, the evaluation executing unit 132 compares the judgment result based on the old training data and the judgment result based on the new training data with an expected value for each check point, judges normality or abnormality, and set the judgment results as object values. Then, the evaluation executing unit 132 stores the calculated object values in the evaluation result 116.

For example, in a case where the "trend of the individual change in the judgment results" of the item number "4" is set as the evaluation index, the evaluation executing unit 132, for each check point, acquires the judgment result based on the new training data and the judgment result based on the old training data as target values. In addition, the evaluation executing unit 132 acquires check points for which the judgment result based on the old training data and the judgment result based on the new training data change and sets the acquired change in the judgment result for the check points as object values. Then, the evaluation executing unit 132 stores the calculated object value in the evaluation result 116.

For example, in a case where the "trend in the total evaluation value" of the evaluation index "5" is set as the evaluation index, the evaluation executing unit 132, for each check point, acquires the total evaluation value of the judgment result based on the new training data and the judgment result based on the old training data as target values. In addition, the evaluation executing unit 132 calculates a difference between the acquired total evaluation values of the judgment results based on the new and old training datas and sets the calculated result as an object value. Then, the evaluation executing unit 132 stores the calculated object values in the evaluation result 116.

For example, in a case where the "highest value of the total evaluation values" of the item number "6" is set as the evaluation index, the evaluation executing unit 132, for each check point, acquires the total evaluation value of the judgment result based on the new training data and the total evaluation value of the judgment result based on the old training data as target values. In addition, the evaluation executing unit 132 acquires a highest value from among the acquired total evaluation values of the judgment results based on the new training data and a highest value of the total evaluation values of the judgment result based on the old training data. Then, the evaluation executing unit 132 calculates a difference between the acquired highest values and set the calculated result as an object value. Then, the evaluation executing unit 132 stores the calculated object value in the evaluation result 116.

For example, in a case where the "trend in the weighting factor" of the index number "7" is set as the evaluation index, the evaluation executing unit 132 acquires a learning result (weighting factor) based on the new training data and a learning result (weighting factor) based on the old training data as target values in association with each name identification target. In addition, the evaluation executing unit 132 calculates the amount of change in the acquired weighting factors of the learning results based on the new and old training datas for each name identification item. Then, the evaluation executing unit 132 sets an amount of change, which has a large difference, out of the calculated amounts of changes as an object value. Then, the evaluation executing unit 132 stores the object value and a corresponding weighting factor in the evaluation result 116. Here, the learning results (weighting factors) set as the target values or the object values may be targeted for all the items of the name identification items or some items thereof.

The evaluation result reflecting unit 126 judges whether the object value of the new training data is a good change or a bad change with respect to the object value of the old training data based on the object value of the old training data and the object value of the new training data for the evaluation index derived by the evaluation executing unit 132. In other words, the evaluation result reflecting unit 126 judges whether the new training data is better than or worse than the old training data. Otherwise phrased, the evaluation result reflecting unit 126 judges whether the learning result based on the new training data is better than or worse than the learning result based on the learning result based on the old training data. Here, the judgment guide and the reflection guide after judgment for each evaluation index will be described with reference to FIG. 4. FIG. 4 is a diagram illustrating a specific example of the reflection of an evaluation result for each evaluation index. In FIG. 4, each item number k0 is associated with an evaluation index name k1, a judgment guide k2, and a reflection guide after judgment k3. The evaluation index name k1, similarly to the evaluation index name h1 illustrated in FIG. 3, represents the name of an evaluation index. The judgment guide k2 represents a guide for judging whether a new training data is good or bad based on a change in the object values of the new and old training datas. The reflection guide after judgment k3 represents a guide for reflecting a judgment result on a new training data after the judgment. In addition, a guide represented as the reflection guide after judgment k3 is performed by a staff (for example, a user).

For example, in a case where the item number is "1", and the evaluation index name k1 is the "accuracy rate of the judgment result", the evaluation result reflecting unit 126 compares the accuracy rate as the object value of the old training data and the accuracy rate as the object value of the new training data and judges a good change (o) in a case where the accuracy rate of the new training data is higher than that of the old training data. On the other hand, in a case where the accuracy rate of the new training data is lower than that of the accuracy rate of the old training data, the evaluation result reflecting unit 126 judges a band change (x). After the judgment, a user selects a check point of which the judgment result is undeterminable out of the judgment results judged using the learning results based on the new training data and, among training datas included in the new training datas and are different from the old training datas, searches a training data that has a judgment result different from the expected value of the check point out of training datas close to the selected check point. Then, the user removes the retrieved training data from the new training data.

For example, in a case where the item number is "2", and the evaluation index name k1 is the "change in the classification hyperplane", the evaluation result reflecting unit 126 compares the number of check points for each judgment result as the object value of the old training data and the number of check points for each judgment result as the object value of the new training data for each judgment result. Then, the evaluation result reflecting unit 126 judges a pattern of a judgment result of which the change is large, by referring to the check point that results in the judgment result, as a good change (o) or a bad change (x). After the judgment, for the pattern in the case of the bad change, the user selects the check point that results in the judgment result of this pattern. Then, among training datas that are included in the new training datas and is different from the old training data, a training data of which the judgment result is different from the check point out of training datas close to the selected check point is searched, and the user removes the retrieved training data from the new training data.

For example, in a case where the item number is "3", and the evaluation index name k1 is the "judgment of a significant point", the evaluation result reflecting unit 126, for a check point, acquires whether or not the judgment result as the object value of the old training data is normal and the judgment result as the object value of the new training data is normal. Then, the evaluation result reflecting unit 126, for each check point of which the judgment changes, judges a good change (o) or a bad change (x). After the judgment, for the check point in the case of the bad change, the user, among training datas that are included in the new training datas and are different from the old training data, searches a training data of which the judgment result is different from the check point out of training datas close to this check point and removes the retrieved training data from the new training data.

For example, in a case where the item number is "4", and the evaluation index name k1 is the "trend of the individual change in the judgment results", the evaluation result reflecting unit 126, for each check point, acquires a change in the judgment results of the old training data and the new training data as an object value. Then, the evaluation result reflecting unit 126 judges a good change (o) or a bad change (x) for each check point of which the judgment result changes. After the judgment, for the check point in the case of the bad change, the user, among training datas that are included in the new training datas and are different from the old training data, searches a training data of which the judgment result is different from the check point out of training datas close to this check point and removes the retrieved training data from the new training data.

For example, in a case where the item number is "5", and the evaluation index name k1 is the "trend in the total evaluation value", the evaluation result reflecting unit 126 acquires a difference (change amount) of the total evaluation values of the judgment results based on the new and old training datas as the object value. Then, the evaluation result reflecting unit 126 judges a good change (○) or a bad change (x) for each check point of which the change amount is large. After the judgment, for the check point in the case of the bad change, the user, among training datas that are included in the new training datas and are different from the old training data, searches a training data of which the judgment result is different from the check point out of training datas close to this check point and removes the retrieved training data from the new training data.

For example, in a case where the item number is "6", and the evaluation index name k1 is the "highest value of the total evaluation values", the evaluation result reflecting unit 126 acquires a difference of the highest values of the total evaluation values based on the new and old training datas as the object value. Then, the evaluation result reflecting unit 126, based on the acquired difference, judges a good change (○) in a case where the highest value of the total evaluation value based on the new training data is higher than that based on the old training data and judges a bad change (x) in a case where the highest value of the total evaluation value based on the new training data is lower than that based on the old training data. After the judgment, for the case of the bad change, the user detects a training data that is included in the new training datas and is different from the old training data and checks whether or not there is a contradiction between the detected training data and other training datas. Then, a training data having a contradiction is removed from the new training datas. Here, the checking of whether or not there is a contradiction can be performed by checking whether or not there is a training datas included in both the positive example and the negative example, for example, for a set of records having the same property or a close property.

For example, in a case where the item number is "7", and the evaluation index name k1 is the "trend in the weighting factor", the evaluation result reflecting unit 126 acquires a change amount of the learning results (weighting factors) based on the new and old training datas for each name identification item as the object value. Then, the evaluation result reflecting unit 126 judges a good change (○) in a case where the weighting factor for each name identification item changes in a direction matching with the user sense and judges a bad change (x) in a case where the weighting factor for each name identification item changes in a direction not matching with the user sense. This judgment may be performed by a staff or may be performed comparing the weighting factor with a weighting factor predicted by a staff in advance and making a judgment based on the difference. After the judgment, in the case of a bad change, the user searches a training data that is included in the new training datas and is different from the old training data and performs reexamination.

Figure 5:
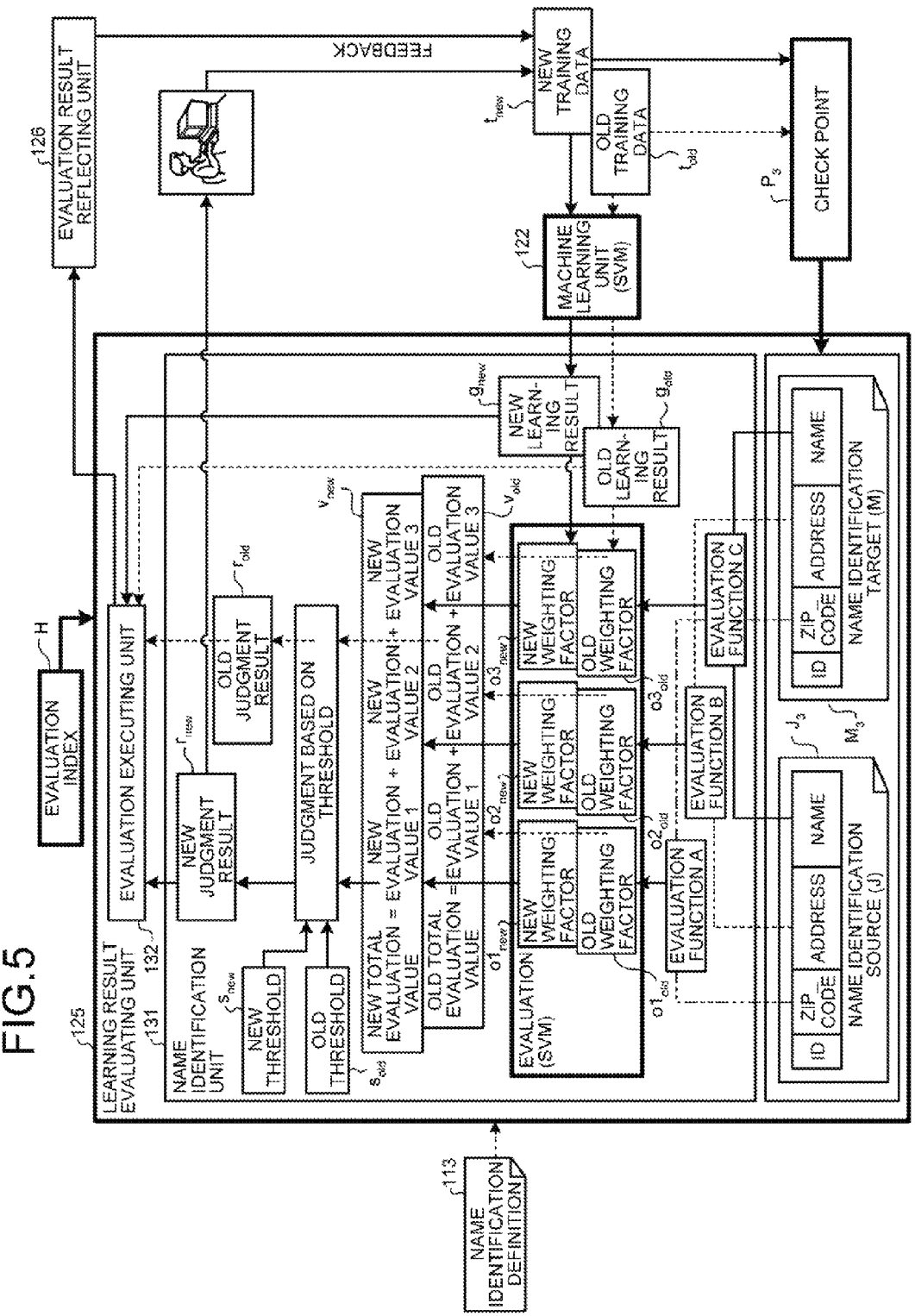
FIG. 5 is a diagram illustrating a learning result evaluating operation of a learning result evaluating unit according to an embodiment.

Next, the operation of evaluating a learning result that is performed by the learning result evaluating unit 125 will be described with reference to FIG. 5. FIG. 5 is a diagram illustrating a learning result evaluating operation of the learning result evaluating unit according to an embodiment. As illustrated in FIG. 5, the name identification unit 131 acquires a check point $P_3$ and applies evaluation functions defined for each name identification item to the values of the name identification items of the name identification source record $J_3$ and the name identification target record $M_3$ of the acquired check point $P_3$ so as to be combined. Here, it is assumed that the name identification items are a zip code, an address, and a name, and the name identification unit 131 applies an evaluation function A, an evaluation function B, and an evaluation function C to the zip code, the address, and the name out of the name identification items based on the name identification definition 113.

The name identification unit 131 acquires an old learning result $g_{old}$ that is learned by the name identification definition 113 and the machine learning unit 122 by using an old training data $t_{old}$. In the old learning result $g_{old}$, an old weighting factor $o_{old}$ and an old threshold $s_{old}$ for each name identification item are set. Then, the name identification unit 131 adds old evaluation values acquired by multiplying values acquired by applying the evaluation functions, as a result of a matching, by the old weighing factors $o_{old}$ for each name identification item, thereby deriving an old total evaluation value $v_{old}$. Then, the name identification unit 131 performs a judgment of name identification for the derived old total evaluation value $v_{old}$ based on the old threshold $s_{old}$ and outputs the old judgment result $r_{old}$ to the evaluation executing unit 132 together with intermediate results.

In addition, the name identification unit 131 acquires a new learning result $g_{new}$ learned by the machine learning unit 122 by using a new training data $t_{new}$. In the new learning result $g_{new}$, a new weighting factor $o_{new}$ and a new threshold $s_{new}$ for each name identification item are set. Then, the name identification unit 131 adds new evaluation values acquired by multiplying values acquired by applying the evaluation functions, as a result of a matching, by the new weighing factors $o_{new}$ for each name identification item, thereby deriving a new total evaluation value $v_{new}$. Then, the name identification unit 131 performs a judgment of name identification for the derived new total evaluation value $v_{new}$ based on the new threshold $s_{new}$ and outputs the new judgment result $r_{new}$ to the evaluation executing unit 132 together with intermediate results.

Then, the evaluation executing unit 132 performs evaluation corresponding to an evaluation index H set by the evaluation index setting unit 123 by using the new judgment result $r_{new}$ and the old judgment result $r_{old}$ or the new total evaluation value $v_{new}$ and the old total evaluation value $v_{old}$ as intermediate results as target values. In other words, the evaluation executing unit 132 acquires target values (the new judgment result $r_{new}$, the old judgment result $r_{old}$, the new total evaluation value $v_{new}$, the old evaluation value $v_{old}$, and the like) for the evaluation index H from the name identification unit 131 and applies a derivation sequence corresponding to the evaluation index H to the acquired target values so as to calculate the object value of the evaluation index H. Then, the evaluation executing unit 132 outputs the calculated object value of the evaluation index H to the evaluation result reflecting unit 126.

As a result, the evaluation result reflecting unit 126, for a check point $P_3$, monitors a change between the old judgment result $r_{old}$ and the new judgment result $r_{new}$, a change between the old total evaluation value $v_{old}$ and the new total evaluation value $v_{new}$, and the like and judges a change in a good direction or a change in a bad direction, thereby judging the new learning result $g_{new}$ and the new training data $t_{new}$ to be good or bad. Then, the evaluation result reflecting unit 126 applies feedback of the result of the judgment to the new training data $t_{new}$ or reflects the result of the judgment on the check point $P_3$.

Sequence of Learning Result Evaluating Process According to Embodiment

Next, the sequence of a learning result evaluating process according to an embodiment will be described with reference to FIG. 6A. FIG. 6A is a flowchart illustrating the learning result evaluating process according to an embodiment.

First, the control unit 12 reads the name identification definition 113 and sets environments of each function such as a name identification function or a learning function in Step S11. Then, the evaluation executing unit 132 reads an evaluation index that is an output of the evaluation index setting unit 123 and sets the evaluation index in Step S12. This evaluation index includes three elements of a value (target value) of an evaluation target used for evaluation, an object value to be derived, and the derivation sequence of deriving the object value from the target value.

Then, the name identification unit 131 reads a check point that is an output of the check point setting unit 124 and sets the check point in Step S13. Then, the machine learning unit 122 acquires new and old training datas from the training data setting unit 121, performs learning using the acquired new and old training datas, and outputs the new and old learning results to the name identification unit 131 in Step S14.

Subsequently, the name identification unit 131 selects one set of check points in Step S15. Then, the name identification unit 131 performs evaluation of the selected check points by using the old learning result and acquires an old target value of the evaluation index in Step S16. In addition, the name identification unit 131 performs evaluation of the selected check points by using the new learning result and acquires a new target value of the evaluation index in Step S17.

Then, the evaluation executing unit 132 derives an object value from the new and old target values in accordance with the sequence of deriving the evaluation index and records the object value in the evaluation result 116 in Step S18. Then, the name identification unit 131 judges whether or not there is remaining check points in Step S19. In a case where it is judged that there are remaining check points (Yes in Step S19), the name identification unit 131 proceeds to Step S15 so as to evaluate the remaining check points. On the other hand, in a case where it is judged that there is no remaining check point (No in Step S19), the evaluation executing unit 132 counts all the recorded object values and records the counted result in the evaluation result 116 in accordance with the evaluation index in Step S20.

Sequence of Evaluation Result Reflecting Process According to Embodiment

Figure 6B:
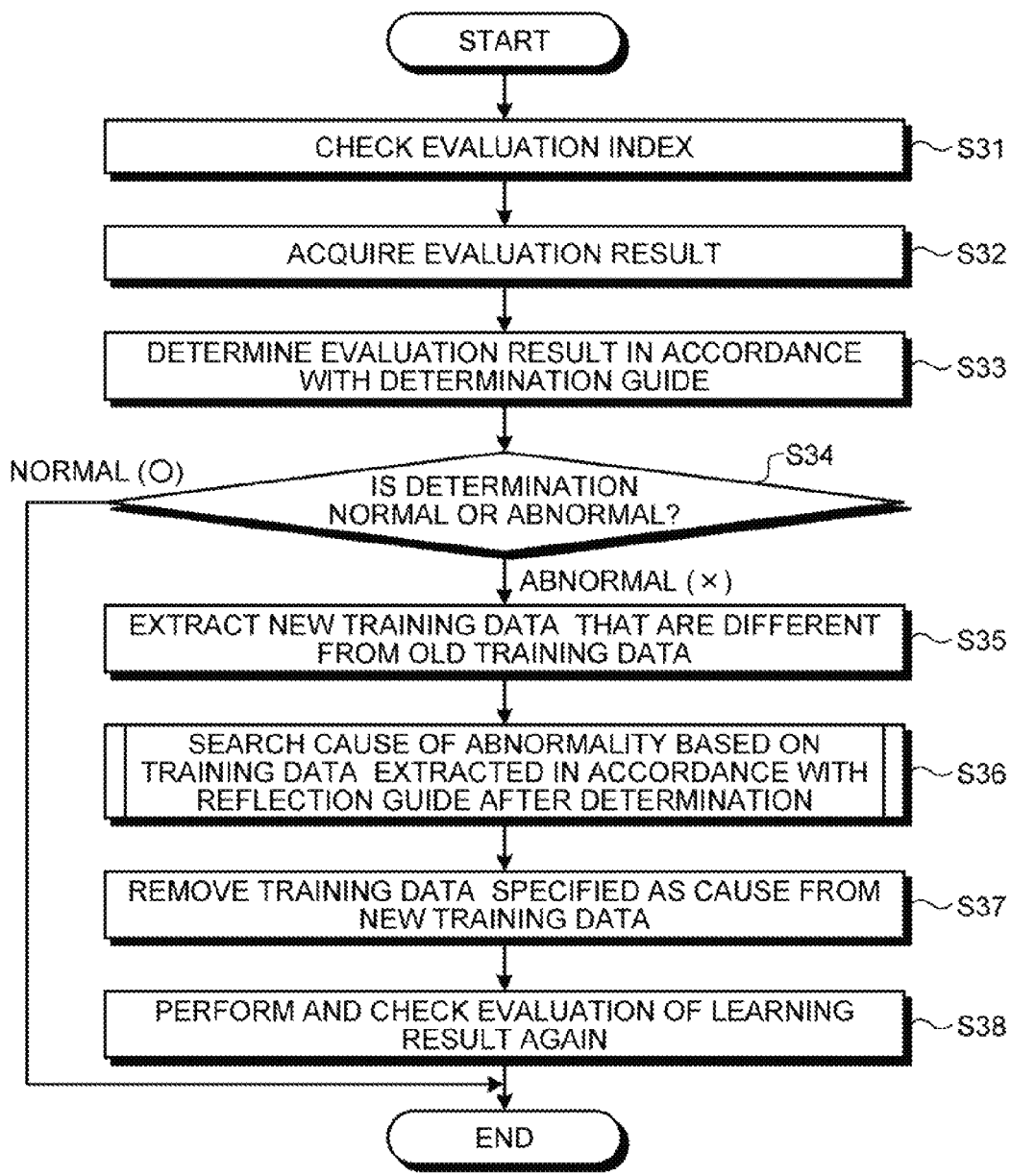
FIG. 6B is a flowchart illustrating an evaluation result reflecting process according to an embodiment.

Subsequently, the sequence of an evaluation result reflecting process according to an embodiment will be described with reference to FIG. 6B. FIG. 6B is a flowchart illustrating the sequence of the evaluation result reflecting process according to an embodiment.

First, the evaluation result reflecting unit 126 checks an evaluation index in Step S31 and acquires the evaluation result 116 for the evaluation index that is recorded by the evaluation executing unit 132 in Step S32. Next, the evaluation result reflecting unit 126 judges whether the object value of the new training data is a good change or a bad change with respect to the object value of the old training data based on the acquired evaluation result based on the judgment guide (k2) of the evaluation index in Step S33.

In a case where there is a good change (normality (○) in Step S34), the evaluation result reflecting unit 126 ends the process. On the other hand, in a case where there is a bad change (abnormality (x) in Step S34), the evaluation result reflecting unit 126 extracts training datas that are included in the new training datas and are different between the new and old training datas in Step S35 and searches a training data that is the cause of the abnormality out of the training datas extracted based on the reflection guide after the judgment of the evaluation index (k3) in Step S36. Then, the training data specified as the cause is removed from the new training datas in Step S37. Here, the process of Step S36 and Step S37 may be performed by a staff accompanying a judgment made by the staff.

Finally, evaluation of the learning result is performed again by using the training datas from which the cause is removed as the new training data, checks that correct is made correctly in Step S38, and ends the evaluation result reflecting process.

Neighbor Training data Searching Process According to Embodiment

The processing sequence of searching a training data close to a specific check point that can be used in Step S36 illustrated in FIG. 6B will be described with reference to FIG. 6C. FIG. 6C is a flowchart illustrating the sequence of a neighbor training data searching process according to an embodiment.

First, one set of check points as a target is specified in Step S41, a name identification process using a learning result based on the new training data is performed for the specified check point, and the intermediate results of the name identification process is recorded in Step S42. Here, as the recording of the intermediate result, an evaluation value acquired by multiplying a value acquired by applying an evaluation function to a target item by a weighting factor is recorded.

Then, all the training datas as search targets are specified in Step S43, a name identification process using a learning result based on the new training data is performed for all the specified training datas, and the intermediate result of the name identification process is recorded in Step S44. Next, a matching between the intermediate result of the check point that is recorded in Step S42 and the intermediate result of the training data that is recorded in Step S44 is performed, whereby a distance is calculated in Step S45. In this matching process, the distance is calculated by acquiring a difference between weighted evaluation values for all the name identification items and adding the differences.

Finally, a closest training data of the training datas acquired in Step S45 is output as a search result in Step S46, and the search process ends.

Here, specific examples of the evaluation of a learning result and the reflection of the evaluation result for each evaluation index will be described with reference to FIGS. 7A to 7G. In FIGS. 7A to 7F, "●" represents a check point that has White as an expected value of the name identification, and "♦" represents a check point that has Black as an expected value of the name identification. In addition, a triangular mark represents a check point for an evaluation index that does not use an expected value of the name identification.

Figure 7A:
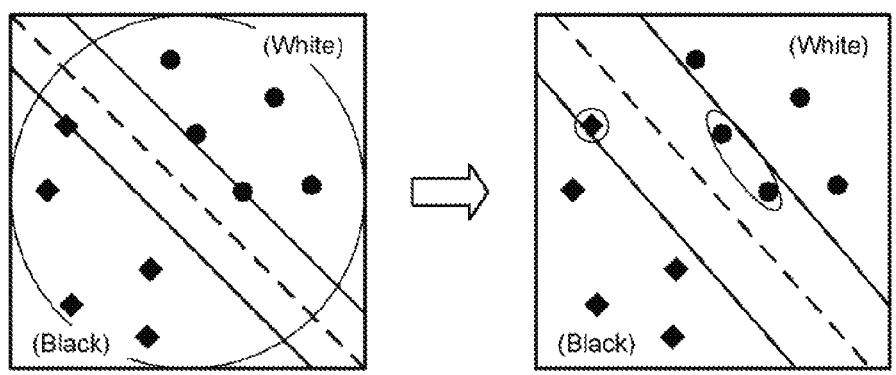
FIG. 7A is a diagram illustrating a specific example of the reflection of an evaluation result in a case where the evaluation index is "accuracy rate of the judgment result" of item no. "1"

FIG. 7A is a diagram illustrating a specific example of the reflection of an evaluation result in a case where the evaluation index is the "accuracy rate of the judgment result" of item number "1". In such an evaluation index, the evaluation executing unit 132, for check points that have been judged by the user in advance and are randomly set, calculates the accuracy rate of the judgment of the name identification as an object value. In the example illustrated in FIG. 7A, a total of five check points of White and Black are set. Since all the judgment results of the name identifications based on the old training datas are correctly judged, the evaluation executing unit 132 calculates the accuracy rate as 100%. In addition, since the judgment results of the name identifications based on the new training datas are three correct results of White and four correct results of Black, the evaluation executing unit 132 calculates the total accuracy rate as 7 results/10 results=70%. Furthermore, since the accuracy rate of the new training datas is lower than that of the old training datas, the evaluation result reflecting unit 126 judges a bad change (x).

Thereafter, the user selects check points of which judgment results of the name identifications based on the new training datas are incorrect and, out of training datas that have a new training data close to the selected check point and are different from the old training datas, a new training data for which a judgment different from the expected value of the check point is made is removed. More specifically, out of training datas of negative examples that exist in an upper Gray (Gray on the positive side of the classification hyperplane) area or positive examples that exist in a lower Gray (Gray on the negative side of the classification hyperplane) area, training datas added as new training datas are checked and removed.

Figure 7B:
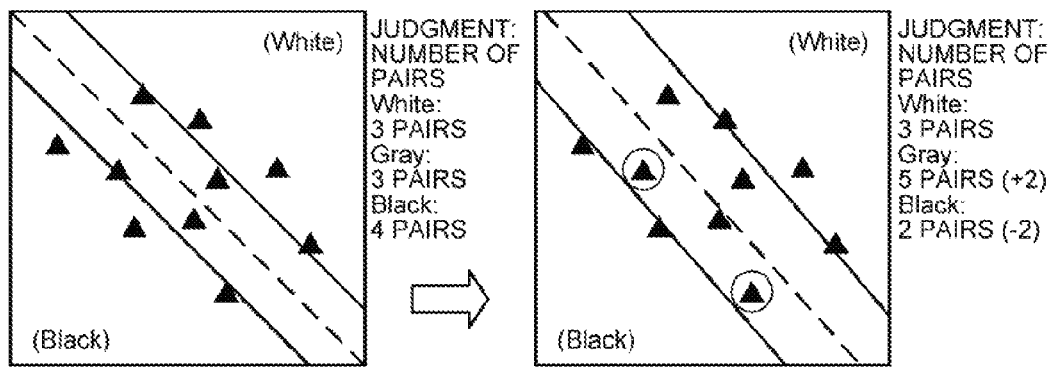
FIG. 7B is a diagram illustrating a specific example of the reflection of an evaluation result in a case where the evaluation index is "change in the classification hyperplane" of item no. "2"

FIG. 7B is a diagram illustrating a specific example of the reflection of an evaluation result in a case where the evaluation index is the "change in the classification hyperplane" of item number "2". In such an evaluation index, the evaluation executing unit 132, for check points of which the total evaluation values are near the support vector of the classification hyperplane (limit surface), calculates the change in the judgment result of the name identification as an object value, thereby sensitively acquiring the change of the classification hyperplane. In the example illustrated in FIG. 7B, a total of five check points of White and Black of that are close to the limit surface are set. Then, the evaluation executing unit 132 calculates three check points of White, three check points of Gray, and four check points of Black as the judgment results of the name identifications based on the old training datas. In addition, the evaluation executing unit 132 calculates three check points of White, five check points of Gray, and two check points of Black as the judgment results of the name identifications based on the new training datas. Then, the evaluation executing unit 132 calculates a change in the judgment results as 0 in the change of White, +2 results in the change in Gray, and −2 results in the change in Black. Furthermore, since the number of judgments of Gray increases, the evaluation result reflecting unit 126 judges a bad change (x). In other words, in the case of the judgment result of the name identification based on the new training datas, the classification hyperplane moves to the lower side (the limit surface is extended), Gray is extended, and, as a result, the number of judgments of Black decreases.

Thereafter, the user selects check points (check points of mark "○" as the result of the name identification based on the new training datas illustrated in FIG. 7B) of which judgment results change for the boundary face between the Gray and Black that are bad changes. Next, out of new training datas that are close to the selected check point, are included in the new training datas, and are different from the old training data, a new training data for which a judgment different from the judgment of the check point is removed. More specifically, out of training datas of negative examples that exist in the upper Gray (Gray on the positive side of the classification hyperplane) area or positive examples that exist in the lower Gray (Gray on the negative side of the classification hyperplane) area, training datas added as new training datas are checked and removed. In the case of this example, the training datas may be removed only from the latter lower Gray area.

Figure 7C:
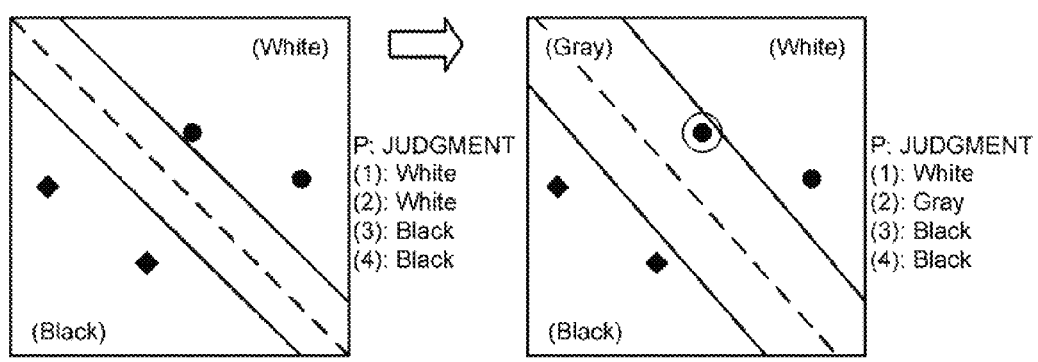
FIG. 7C is a diagram illustrating a specific example of the reflection of an evaluation result in a case where the evaluation index is "judgment of the significant point" of item no. "3"

FIG. 7C is a diagram illustrating a specific example of the reflection of an evaluation result in a case where the evaluation index is the "judgment of the significant point" of item number "3". In such an evaluation index, the evaluation executing unit 132, for check points needs to result in specific judgment results in a reliable manner, the evaluation executing unit 132 calculates whether or not the judgment result of the name identification is normal as an object value. In the example illustrated in FIG. 7C, two check points are respectively set with respect to White and Black. Then, the evaluation executing unit 132 judges that the judgment result of the name identification based on the old training data as normal. In addition, in the judgment result of the name identification based on the new training data, one check point of White is judged as Gray, and accordingly, the evaluation executing unit 132 judges that this check point is abnormal. Furthermore, the evaluation result reflecting unit 126 judges the check points judged as abnormal as a bad change (x). Thereafter, for example, the user removes a new training data that is close (estimated cause) to the check point judged as a bad change.

Figure 7D:
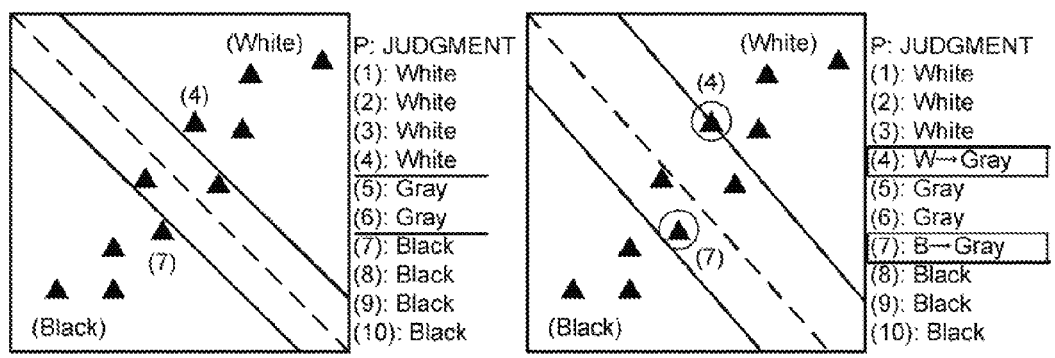
FIG. 7D is a diagram illustrating a specific example of the reflection of an evaluation result in a case where the evaluation index is "individual change trend in the judgment result" of item no. "4"

FIG. 7D is a diagram illustrating a specific example of the reflection of an evaluation result in a case where the evaluation index is the "individual change trend in the judgment result" of item number "4". In such an evaluation index, the evaluation executing unit 132, for check points selected such that the total evaluation values based on the old training datas are random, sets the trend of the change in the judgment result based on the new and old training datas as an object value. In the example illustrated in FIG. 7D, the evaluation executing unit 132 judges that a check point (4) changes from White to Gray, and a check point (7) changes from Black to Gray. In this case, the user, for example, for the changed check points (4) and (7), judges a good change (○) or a bad change (x) for each change. Then, in the case of the bad change, the user removes a new training data close to the check point judged as the bad change. In addition, in a case where the judgment results are different for a plurality of check points, the user may sort the judgment results by using the total evaluation value of the judgment result based on the old training datas and check only the check points close to the boundary of judgments (White/Gray/Black).

Figure 7E:
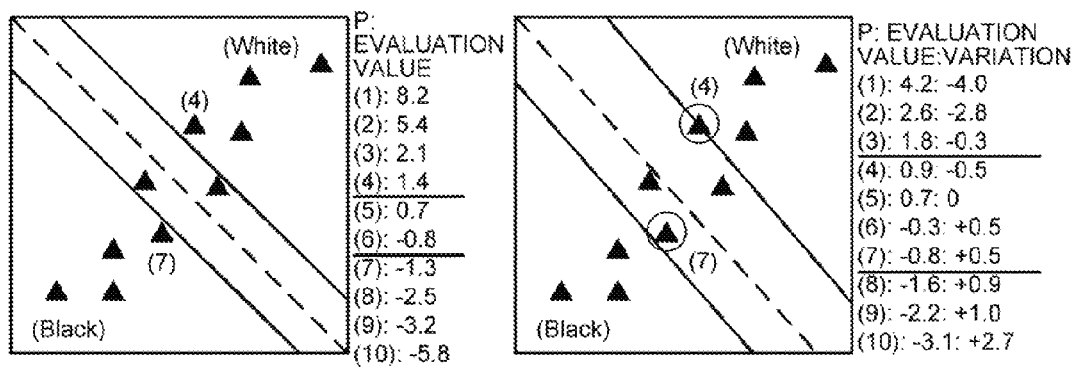
FIG. 7E is a diagram illustrating a specific example of the reflection of an evaluation result in a case where the evaluation index is "trend in the total evaluation value" of item no. "5"

FIG. 7E is a diagram illustrating a specific example of the reflection of an evaluation result in a case where the evaluation index is "trend in the total evaluation value" of item number "5". In such an evaluation index, the evaluation executing unit 132, for check points set such that the total evaluation value based on the old training data is random, sets a difference between the judgment results based on the new and old training datas as the object value. In this evaluation index, in a case where there is abnormality in the above-described index "trend of the individual change in the judgment result", the evaluation executing unit 132 judges the variation in the total evaluation value by excluding the effect of the threshold, and accordingly, a more detailed cause can be investigated. In the example illustrated in FIG. 7E, it is understood that the evaluation is tilted to the classification hyperplane side with a value less than two times for a check point located far from the classification hyperplane, for example, a check point (1), and the change amount for check points (4) and (5) is 0.5 point.

Figure 7F:
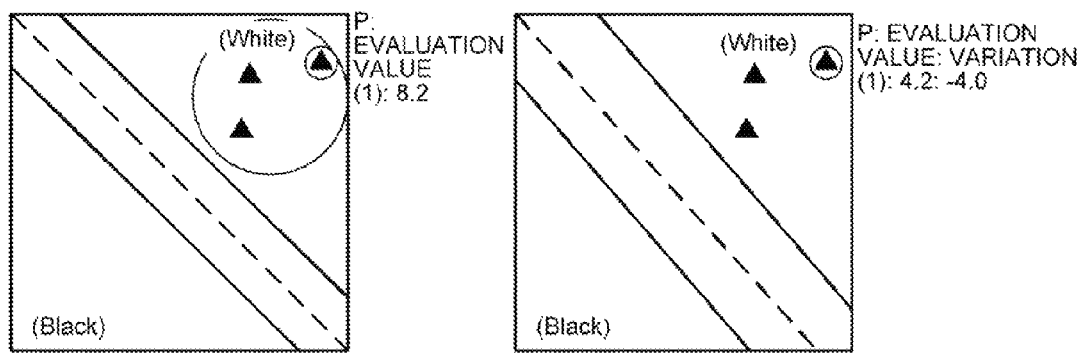
FIG. 7F is a diagram illustrating a specific example of the reflection of the evaluation result in a case where the evaluation index is "highest value of total evaluation values" of item no. "6"

FIG. 7F is a diagram illustrating a specific example of the reflection of the evaluation result in a case where the evaluation index is the "highest value of total evaluation values" of item number "6". In such an evaluation index, the evaluation executing unit 132, for a check point of which the total evaluation value based on the old training data is the highest value, sets the variation in the highest values of the total evaluation values based on the new and old training datas as the object value. In the example illustrated in FIG. 7F, the evaluation executing unit 132 acquires the highest value of the total evaluation value based on the old training datas as 8.2 and the highest value of the total evaluation value based on the new training data as 4.2 and calculates a difference between the acquired highest values as −4.0. Furthermore, since the highest value of the total evaluation value based on the new training data is lower than that based on the old training data, the evaluation result reflecting unit 126 judges a bad change (x). As a result, it can be understood that there may be a cause incurring a contradiction in the correction (a difference from the old training data) made for the new training data, and accordingly, the user reexamines sets of records of training datas, for example, that are included in the new training datas and are not included in the old training datas.

FIG. 7G is a diagram illustrating a specific example of the reflection of an evaluation result in a case where the evaluation index is the "trend in the weighting factor" of item number "7". In such an evaluation index, the reflection process can be performed regardless of check points, and the evaluation executing unit 132, for the "weighting factor" of each name identification item that is derived as a result of performing learning based on the new and old training datas, compares the new and old training datas and sets a difference between the weighting factors for each name identification item as the object value. In the example illustrated in FIG. 7G, the number of the name identification items is ten, and the evaluation executing unit 132 calculates the variation in the weighting factor based on the weighting factor for each name identification item that is derived as a result of the learning based on the new and old training datas. In addition, the evaluation result reflecting unit 126 selects a company name (i1), a company name Kana (i2), a zip code (i7), and an address (i8) that are name identification items having a large variation. Then, out of the selected name identification items, the signs of the variation in the company name (i1), the company name Kana (i2) are inverted, the weighting factor of the company name Kana (i2) is higher than that of the company name (i1), and there is a change in a direction opposite to the user sense, whereby the evaluation result reflecting unit 126 judges a bad change (x). As a result, the user reexamines a set of records of training datas, for example, that is included in the new training data and is not included in the old training data.

Advantages of Embodiment

According to the above-described embodiment, the information matching apparatus 1 sets a training data in the machine learning unit 122 that is configured by a supervised-learning type machine learning device that learns a judgment criteria used for the judgment of the name identification. Then, the information matching apparatus 1 sets check points each configured by two records as one set that are used for evaluating a training data. Then, the information matching apparatus 1 acquires a change between the old judgment result using the learning result based on the set old training data and the new judgment result using the learning result based on the new training data for the set check points and evaluates the new training data based on the acquired change.

In such a configuration, since the information matching apparatus 1 acquires a change between the old judgment result and the new judgment result using the learning results based on the new and old training datas for the check points and evaluates the new training data based on the acquired change, the validness of the new training data or the contradiction between training datas can be evaluated. As a result, the information matching apparatus 1 can generate an appropriate training data based on the evaluation. In addition, since the information matching apparatus 1 can evaluate the validness of the training data, the degradation of the quality of the judgment result according to incorrect learning (erroneous learning) due to an incorrect training data or biased learning (over-learning) due to biased training data can be prevented. As a result, the information matching apparatus 1 can assure the stability of the judgment result of the name identification and can reduce the costs relating to the name identification.

In addition, according to the above-described embodiment, the evaluation result reflecting unit 126 analyzes the evaluation result evaluated by the learning result evaluating unit 125 and reflects the evaluation result on the new training data. In such a configuration, the evaluation result reflecting unit 126 can assure to improve the learning result toward a desired direction based on the reflected new training data.

Furthermore, according to the above-described embodiment, the evaluation executing unit 132 can acquired the expected value of the judgment in advance and, for a plurality of check points, acquires a change in the accuracy rate of the judgment result using the learning result based on the old training datas and the accuracy rate of the judgment result using the learning result based on the new training data. In such a configuration, since the evaluation executing unit 132, based on the change in the accuracy rate of the old training datas and the accuracy rate of the new training data, can judge a good change or a bad change, the average validness of the new training datas can be reliably evaluated.

In addition, according to the above-described embodiment, the evaluation executing unit 132, for a plurality of check points located near the limit surface, acquires a change in the number of check points for each judgment result using the learning result based on the old training data and the number of the check points for each judgment result using the learning result based on the new training data. In such a configuration, since the evaluation executing unit 132 can check the direction of the movement of the judgment result as the direction of White or the direction of Black based on the change in the number of check points for each judgment result, a change in the classification hyperplane or the limit surface can be sensitively checked.

Furthermore, according to the above-described embodiment, the evaluation executing unit 132, for significant check points of which the expected values of the judgment results are known in advance, checks whether the judgment result using the learning result based on the old training data matches with the expected value. Then, the evaluation executing unit 132, for check points of which the expected values of the judgment results are known, checks whether the judgment result using the learning result based on the new training datas matches with the expected values. Then, the evaluation executing unit 132 acquires a change in the judgment results based on the new and old training datas for the check points. In such a configuration, since the evaluation executing unit 132 can check whether the judgment results based on the new and old training datas for each significant check point is normal, the validness of the new training data can be reliably evaluated, and accordingly, the evaluation results of the check points can be assured.

In addition, according to the above-described embodiment, the evaluation executing unit 132, for each of check points that are selected such that the total evaluation values based on the old training datas are random, acquires a change in the judgment result using the learning result based on the old training data and the judgment result using the learning result based on the new training data. In such a configuration, the evaluation executing unit 132, for each of check points distributed over the entire area of the total evaluation values based on the old training datas, the trend of the change in the judgment result based on the new and old training datas can be acquired, and a specific check point having a bad change in the judgment results based on the new and old training datas can be known, whereby the new training datas located near the check point can be refined as the candidates for training datas to be considered.

Furthermore, according to the above-described embodiment, the evaluation executing unit 132, for each of check points that are selected such that the total evaluation values based on the old training datas are random, acquires a change in the total evaluation value as the judgment result using the learning result based on the old training data and the total evaluation value as the judgment result using the learning result based on the new training data. In such a configuration, the evaluation executing unit 132 can support to check the cause of a detailed change based on the change in the total evaluation value from which the effect of the threshold is excluded.

In addition, according to the above-described embodiment, the evaluation executing unit 132 acquires a change in the maximum value of the total evaluation value as the judgment result using the learning result based on the old training datas and the maximum value of the total evaluation value as the judgment result using the learning result based on the new training datas. In such a configuration, the evaluation executing unit 132 acquires a change in the maximum values of the total evaluation values of the new and old training datas, and the size of the margin of the learning result can be indirectly detected, whereby the possibility of the presence and the degree of a cause incurring a contradiction in training datas of a difference between the new and old training datas can be acquired.

Furthermore, according to the above-described embodiment, the evaluation executing unit 132 acquires a change in the weighting factor of the learning result used for the judgment of the old training datas and the weighting factor of the learning result used for the judgment of the new training datas. In such a configuration, the evaluation executing unit 132 acquires a change in the weighting factors of the learning results based on the new and old training datas, whereby it can be checked that the weighting factor derived as a result of learning matches with the human sense.

In addition, according to the above-described embodiment, the check point setting unit 124 can selectively set check points from among training datas 114 stored as positive examples and negative examples in advance. In such a configuration, the check point setting unit 124 sets the training data of the positive example as a check point having an expected value of the judgment of White and sets the training data of the negative example as a check point having an expected value of the judgment of Black, whereby the check points can be selected and set in an easy manner.

Program and the Like

In addition, the information matching apparatus 1 can be realized by mounting each function of the storage unit 11, the control unit 12, and the like described above in an information processing apparatus such as a general personal computer or a workstation.

In addition, the constituent elements of the information matching apparatus 1 illustrated in the figures do not need to be physically configured as illustrated in the figures. In other words, a specific form of the distribution or integration of the information matching apparatus 1 is not limited to that illustrated in the figure, and the entirety or a part thereof may be configured so as to be physically divided or integrated in an arbitrary unit based on various loads, the use state, and the like. For example, the learning result evaluating unit 125 and the evaluation result reflecting unit 126 may be integrated as one unit. On the other hand, the evaluation result reflecting unit 126 may be divided into a judgment unit that judges the new training data to be good or bad based on the evaluation results based on the new and old training datas and a reflection unit that reflects the judgment of the new training data as good or bad on the new training data. In addition, various DBs such as the name identification target DB 112 and the name identification source DB 111 may be connected to the information matching apparatus 1 through a network as external devices of the information matching apparatus 1.

In addition, various processes described in the above-described embodiment can be realized by executing a program prepared in advance by using a computer such as a personal computer or a workstation. Thus, hereinafter, an example of a computer that executes an information matching program having the same functions as those of the control unit 12 of the information matching apparatus 1 illustrated in FIG. 1 will be described with reference to FIG. 8.

Figure 8:
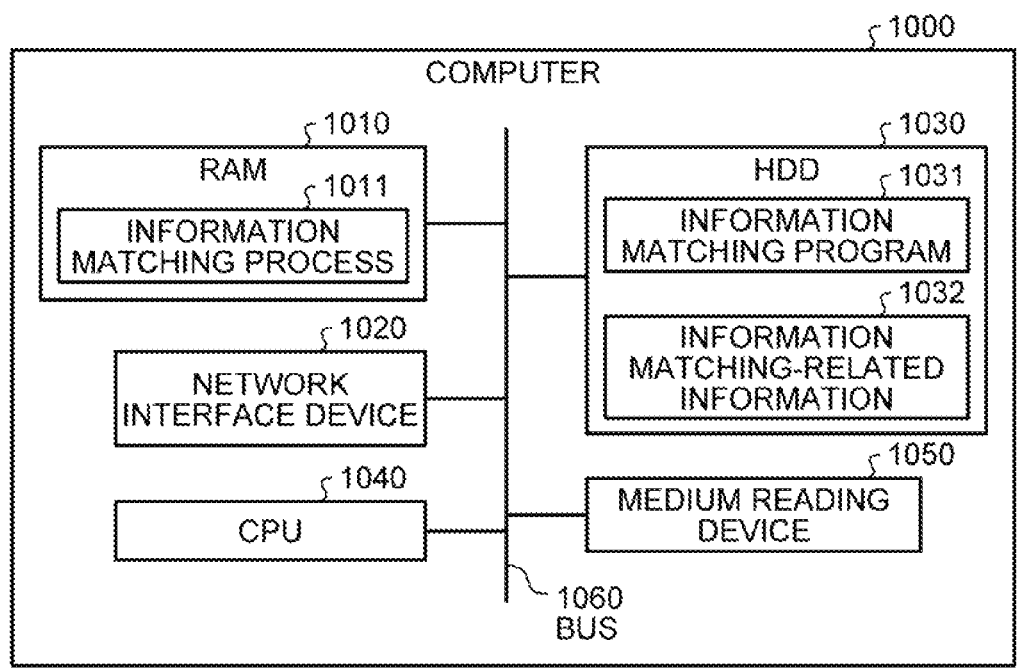
FIG. 8 is a diagram illustrating a computer that executes an information matching program.
Figure 9:
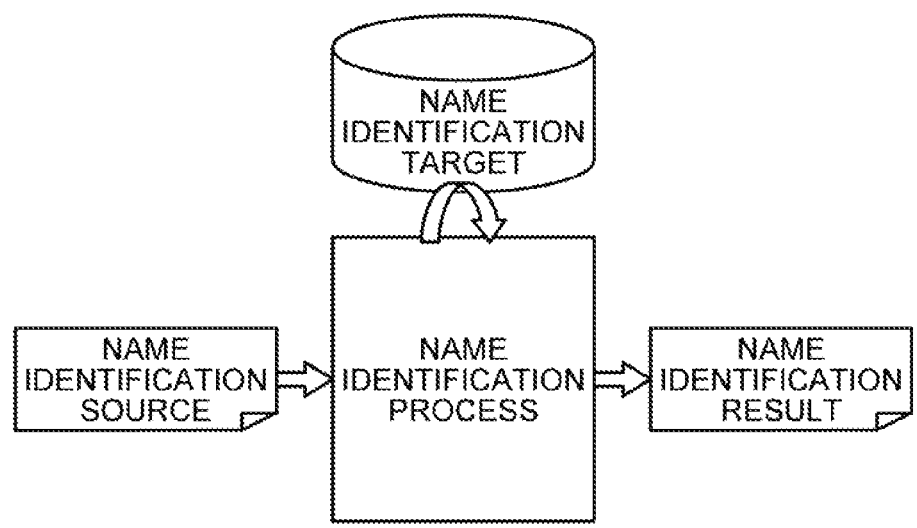
FIG. 9 is a diagram illustrating a name identification function.
Figure 10:
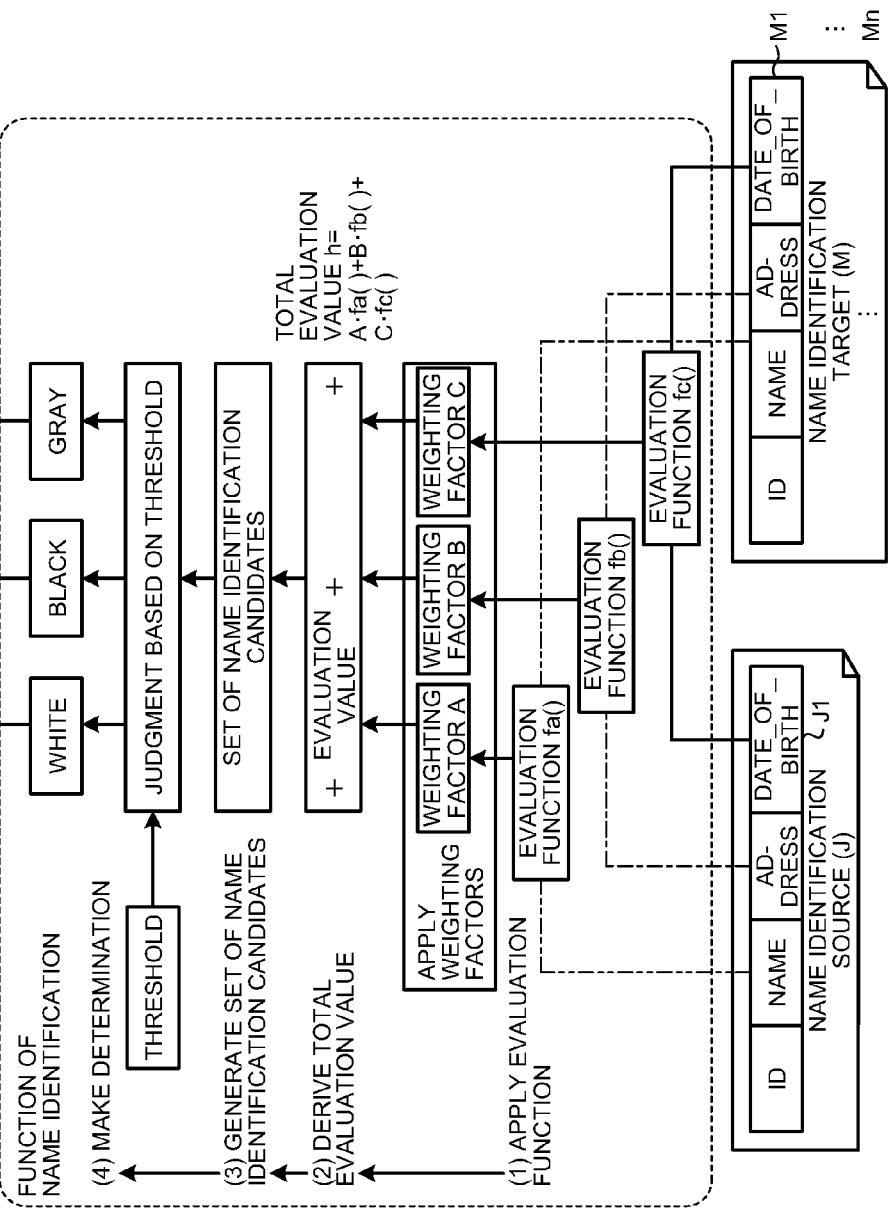
FIG. 10 is a diagram illustrating the operation of the name identification function.
Figure 11:
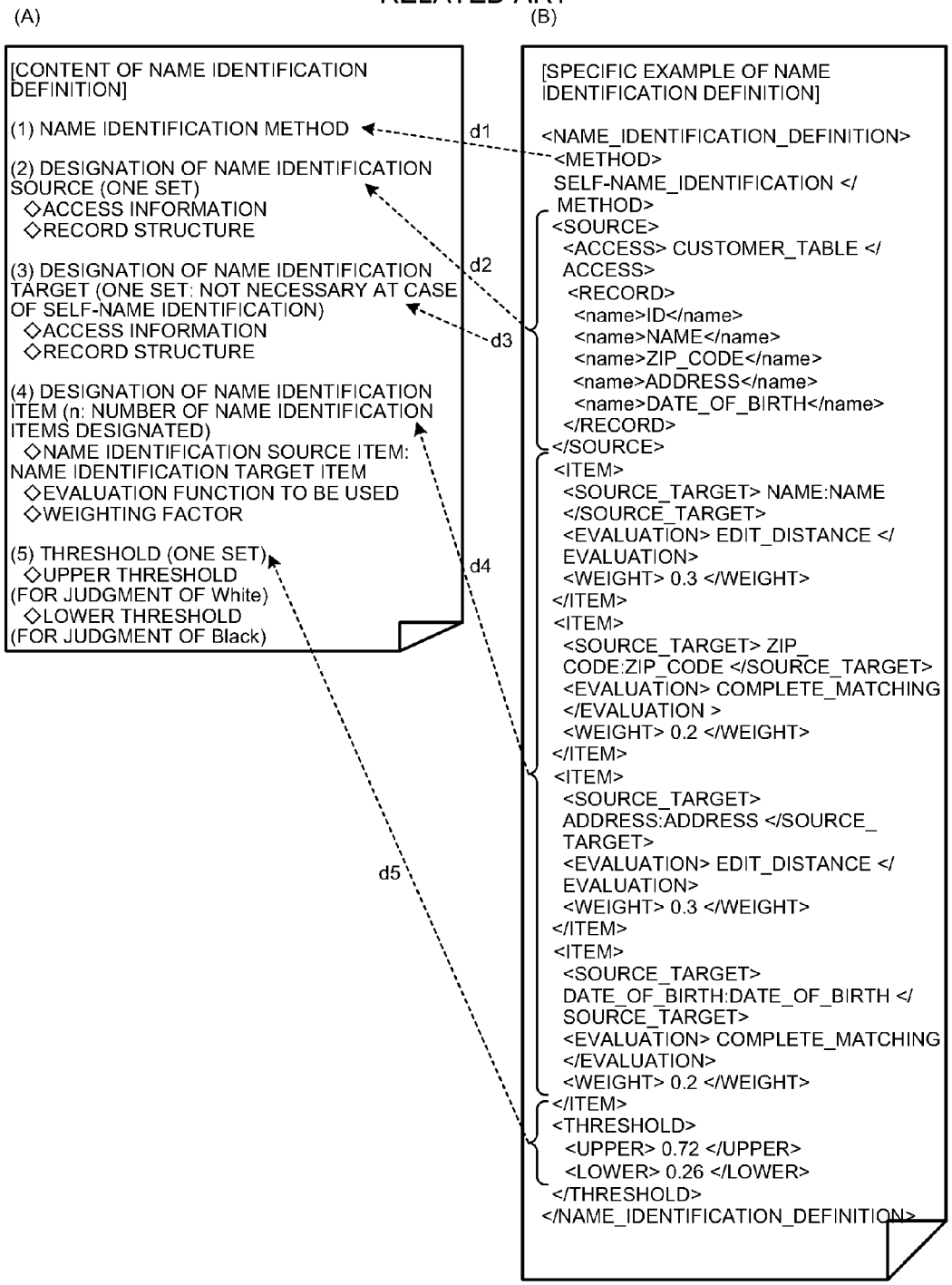
FIG. 11 is a diagram illustrating an example of the data structure of a name identification definition.
Figure 13:
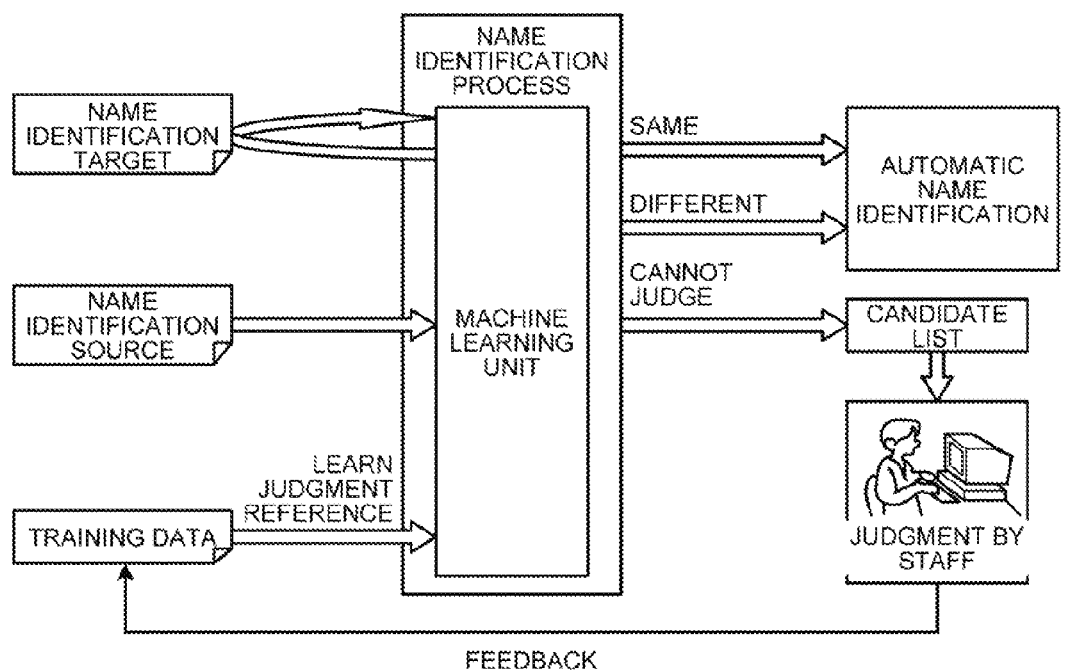
FIG. 13 is a diagram illustrating a name identification process using a machine learning device.

FIG. 8 is a diagram illustrating the computer that executes the information matching program. As illustrated in FIG. 8, a computer 1000 includes a RAM 1010, a network interface device 1020, an HDD 1030, a CPU 1040, a medium reading device 1050, and a bus 1060. The RAM 1010, the network interface device 1020, the HDD 1030, the CPU 1040, the medium reading device 1050 are interconnected through the bus 1060.

In the HDD 1030, an information matching program 1031 that has the same function as that of the control unit 12 illustrated in FIG. 1 is stored. In addition, in the HDD 1030, information matching-related information 1032 corresponding to the name identification target DB 112, the name identification source DB 111, the name identification definition 113, the training data 114, the check point 115, and the evaluation result 116 illustrated in FIG. 1 is stored.

As the CPU 1040 reads out the information matching program 1031 from the HDD 1030 and expands the information matching program 1031 in the RAM 1010, the information matching program 1031 serves as an information matching process 1011. The information matching process 1011 appropriately expands the information and the like read out from the information matching-related information 1032 in an area of the RAM 1010 that is assigned by the information matching process 1011 and performs various data processing based on the expanded data and the like.

Even in a case where the information matching program 1031 or the information matching-related information 1032 is not stored in the HDD 1030, the medium reading device 1050 reads out the information matching program 1031 or the information matching-related information 1032 from a medium that stores the information matching program 1031 or the information matching-related information 1032 or the like. As examples of the medium reading device 1050, there are a CD-ROM and an optical disk device. In addition, the network interface device 1020 is a device that is connected to an external device through a network and corresponds to a wired or wireless connection.

In addition, the information matching program 1031 or the information matching-related information 1032 described above does not need to be stored in the HDD 1030, and the program or data stored on the medium reading device 1050 such as a CD-ROM may be read out and executed by the computer 1000. Furthermore, the program or the data may be stored in another computer (or a server) or the like that is connected to the computer 1000 through a public line, the Internet, a LAN, a wide area network (WAN), or the like. In such a case, the computer 1000 reads out the program or the data from another computer through the network interface device 1020 and executes the program or the like.

In a name identification process based on supervised learning, appropriate learning data can be generated, and the degradation of the judgment result of the name identification can be prevented by applying feedback to supervised data and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information matching apparatus comprising:
    a processor; and
    a memory, wherein the processor executes:
    first acquiring a first judgment criteria and a second judgment criteria utilizing a first training data and a second training data, respectively, the first judgment criteria and the second judgment criteria being generated by a machine learning device that learns judgment criteria for name identification process between a plurality of data sets, each of the plurality of data sets including a plurality of records, the name identification process aggregating a plurality of data with identical content;
    selecting a plurality of check points, each of the plurality of check points being a pair of two records in different data sets and having a specific result for the name identification process, specific results of the plurality of check points being known in advance, respectively;
    second acquiring judgment differences between a first judgment result by the first judgment criteria and a second judgment result by the second judgment criteria, for the name identification judgment to the plurality of check points;
    evaluating the second training data based on the judgment differences and an evaluation of the second training data; and
    analyzing an evaluation result obtained at the evaluating and reflecting the evaluation result on the second training data in response to a reflection guide selected from a plurality of reflection guides.

2. The information matching apparatus according to claim 1, wherein the second acquiring, acquires the judgment differences between a ratio of the judgment result using the first judgment criteria that matches with the specific result to the plurality of check points and a ratio of the judgment result using the second judgment criteria that matches with the specific result to the plurality of check points.

3. The information matching apparatus according to claim 1, wherein the second acquiring, for the plurality of check points, acquires the judgment differences between the number of the check points for each judgment result using the first judgment criteria and the number of the check points for each judgment result using the second judgment criteria.

4. The information matching apparatus according to claim 1, wherein the second acquiring, for the plurality of the check points, acquires judgment differences between whether the judgment result using the first judgment criteria matches with the specific result and whether the judgment result using the second judgment criteria matches with the specific result.

5. The information matching apparatus according to claim 1, wherein the second acquiring, for each check point, acquire the judgment difference between the judgment result using the first judgment criteria and the judgment result using the second judgment criteria.

6. The information matching apparatus according to claim 1, wherein the second acquiring, for each check point, acquires the judgment difference between an evaluation value indicating the judgment result obtained using the first judgment criteria and an evaluation value indicating the judgment result obtained using the second judgment criteria.

7. The information matching apparatus according to claim 1, wherein the second acquiring, for a check point with a maximum value among evaluation values indicating the judgment results obtained using the first judgment criteria for the plurality of check points, acquires the judgment difference between the maximum value and an evaluation value indicating the judgment result obtained using the second judgment criteria.

8. The information matching apparatus according to claim 1, wherein the second acquiring, acquires the judgment difference between the first judgment criteria and the second judgment criteria.

9. The information matching apparatus according to claim 1, wherein the selecting selects the check points from the first training data and the second training data.

10. A non-transitory computer readable storage medium having stored therein an information matching program causing an information matching apparatus to execute a process comprising:
    acquiring a first judgment criteria and a second judgment criteria utilizing a first training data and a second training data, respectively, the first judgment criteria and the second judgment criteria being generated by a machine learning device that learns judgment criteria for name identification process between a plurality of data sets, each of the plurality of data sets including a plurality of records, the name identification process aggregating a plurality of data with identical content;
    selecting a plurality of check points, each of the plurality of check points being a pair of two records in different data sets and having a specific result for the name identification process, specific results of the plurality of check points being known in advance, respectively;
    acquiring judgment differences between a first judgment result by the first judgment criteria and a second judgment result by the second judgment criteria, for the name identification judgment to the plurality of check points;
    evaluating the second training data based on the judgment differences and an evaluation of the second training data; and analyzing an evaluation result obtained at the evaluating and reflecting the evaluation result on the second training data in response to a reflection guide selected from a plurality of reflection guides.

11. A method of matching information performed by an information matching apparatus, the method comprising:

acquiring a first judgment criteria and a second judgment criteria utilizing a first training data and a second training data, respectively, the first judgment criteria and the second judgment criteria being generated by a machine learning device that learns judgment criteria for name identification process between a plurality of data sets, each of the plurality of data sets including a plurality of records, the name identification process aggregating a plurality of data with identical content;

selecting a plurality of check points, each of the plurality of check points being a pair of two records in different data sets and having a specific result for the name identification process, specific results of the plurality of check points being known in advance, respectively;

acquiring judgment differences between a first judgment result by the first judgment criteria and a second judgment result by the second judgment criteria, for the name identification judgment to the plurality of check points;

evaluating the second training data based on the judgment differences and an evaluation of the second training data; and analyzing an evaluation result obtained at the evaluating and reflecting the evaluation result on the second training data in response to a reflection guide selected from a plurality of reflection guides.

* * * * *